United States Patent
Huang et al.

(10) Patent No.: US 12,003,290 B2
(45) Date of Patent: Jun. 4, 2024

(54) TECHNIQUES FOR SWITCHING ORTHOGONAL AND NON-ORTHOGONAL SEQUENCE BASED NONCOHERENT UPLINK CONTROL TRANSMISSIONS

(71) Applicant: QUALCOMM Incorporated, San Diego, CA (US)

(72) Inventors: Yi Huang, San Diego, CA (US); Wei Yang, San Diego, CA (US); Wanshi Chen, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/192,290

(22) Filed: Mar. 4, 2021

(65) Prior Publication Data
US 2021/0328635 A1    Oct. 21, 2021

Related U.S. Application Data

(60) Provisional application No. 63/011,041, filed on Apr. 16, 2020.

(51) Int. Cl.
*H04B 7/0456* (2017.01)
*H04W 72/04* (2023.01)
(Continued)

(52) U.S. Cl.
CPC ...... *H04B 7/0482* (2013.01); *H04W 72/0446* (2013.01); *H04W 72/21* (2023.01); *H04W 72/23* (2023.01); *H04W 76/27* (2018.02)

(58) Field of Classification Search
CPC ........... H04W 72/042; H04W 72/0446; H04W 72/0413; H04W 76/27; H04B 7/0482
See application file for complete search history.

(56) References Cited

U.S. PATENT DOCUMENTS

| 5,602,833 A | * | 2/1997 | Zehavi | H04J 13/0048 370/335 |
| 5,737,326 A | * | 4/1998 | I | H04J 13/0077 370/335 |

(Continued)

FOREIGN PATENT DOCUMENTS

| EP | 3625924 A1 | 3/2020 | |
| EP | 3625924 B1 * | 5/2021 | ........... H04B 7/0486 |

(Continued)

OTHER PUBLICATIONS

"Jie Ding et al., Analysis of Non-Orthogonal Sequences for Grant-Free RA With Massive MIMO, Jan. 2020, IEEE Transaction on communication, vol. 68, No. 1" (Year: 2020).*

(Continued)

*Primary Examiner* — Rasheed Gidado
(74) *Attorney, Agent, or Firm* — Holland & Hart LLP

(57) ABSTRACT

Methods, systems, and devices for wireless communications are described. A transmitter may transmit a payload in transmission to the base station in a wireless communications system. The transmitter may identify a payload to include in the transmission to the base station. The transmitter may determine to transmit the transmission using an orthogonal sequence codebook or a non-orthogonal sequence codebook, based on a size of the payload, a control message from the base station to the transmitter, or a combination of these. The transmitter may then transmit the transmission to the base station based on whether the transmission is to use the orthogonal sequence codebook or the non-orthogonal sequence codebook. The transmission may be a noncoherent transmission. The transmission may be an uplink control information transmission, an uplink data transmission, a downlink control information transmission, or a downlink data transmission.

30 Claims, 11 Drawing Sheets

(51) Int. Cl.
   *H04W 72/0446*   (2023.01)
   *H04W 72/21*     (2023.01)
   *H04W 72/23*     (2023.01)
   *H04W 76/27*     (2018.01)

(56) References Cited

U.S. PATENT DOCUMENTS

| | | | | |
|---|---|---|---|---|
| 8,711,815 | B2* | 4/2014 | Kawamura | H04J 11/003 |
| | | | | 370/335 |
| 9,326,122 | B2* | 4/2016 | Xiong | H04W 72/02 |
| 10,056,951 | B2* | 8/2018 | Cabrejas Penuelas | ............ |
| | | | | H04B 17/336 |
| 10,868,700 | B2* | 12/2020 | Lee | H04L 25/03006 |
| 11,229,062 | B2* | 1/2022 | Huang | H04W 74/0833 |
| 11,336,343 | B2* | 5/2022 | Lee | H04L 5/0005 |
| 2014/0086372 | A1* | 3/2014 | Kishiyama | H04J 13/004 |
| | | | | 375/346 |
| 2014/0146754 | A1* | 5/2014 | Bayesteh | H04W 72/21 |
| | | | | 370/329 |
| 2019/0029031 | A1* | 1/2019 | Kumar | H04W 72/21 |
| 2021/0152409 | A1* | 5/2021 | Pan | H04W 74/0833 |

FOREIGN PATENT DOCUMENTS

| | | |
|---|---|---|
| WO | WO-2018143395 A1 | 8/2018 |
| WO | WO-2019195241 A1 | 10/2019 |

OTHER PUBLICATIONS

ETRI: "Comparison of Full-Length Spreading Domains for NOMA Transmitter Design", 3GPP Draft; R1-1806669, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), 6 Pages, XP051441871, Retrieved from the Internet: URL: http://www.3gpp.org/ftp/Meetings%5F3GPP% 5FSYNC/RAN1/Docs/, [retrieved on May 20, 2018], The whole document.

International Search Report and Written Opinion—PCT/US2021/ 021205—ISA/EPO—dated Jun. 24, 2021.

* cited by examiner

TECHNIQUES FOR SWITCHING ORTHOGONAL AND NON-ORTHOGONAL SEQUENCE BASED NONCOHERENT UPLINK CONTROL TRANSMISSIONS

CROSS REFERENCES

The present application for patent claims the benefit of U.S. Provisional Patent Application No. 63/011,041 by HUANG et al., entitled "SWITCHING ORTHOGONAL AND NON-ORTHOGONAL SEQUENCE BASED NON-COHERENT UPLINK CONTROL TRANSMISSIONS," filed Apr. 16, 2020, assigned to the assignee hereof, which is hereby incorporated by reference in its entirety.

FIELD OF DISCLOSURE

The present disclosure, for example, relates to wireless communications systems, and more specifically to switching orthogonal and non-orthogonal sequence based noncoherent uplink control transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A device may perform coherent demodulation a channel decoding based on a demodulation reference signal (DMRS). In some cases, channel estimation with DMRS may cause decreased channel estimation performance, including in cases of low signal to noise ratio (SNR) of the channel.

SUMMARY

The described techniques relate to improved methods, systems, devices, and apparatuses that support switching orthogonal and non-orthogonal sequence based noncoherent uplink control transmissions. The described techniques provide for a device transmitting a transmission to a receiving device. For example, a receiving device may schedule a transmitter to transmit a payload (e.g., uplink control information (UCI), uplink data, downlink control information (DCI) or downlink data) to the receiving device in a wireless communications system. The transmitter may identify a payload to include in the transmission to the base station. The transmitter may determine to transmit the transmission using an orthogonal sequence codebook or a non-orthogonal sequence codebook, based on a size of the payload, a control message from a base station to a UE, or a combination of these. The transmitter may then transmit the transmission to the receiver based on whether the transmission is to use the orthogonal sequence codebook or the non-orthogonal sequence codebook.

A method for wireless communications at a transmitter is described. The method may include identifying a payload to include in a transmission to a receiver, determining to transmit the transmission using an orthogonal sequence codebook or a non-orthogonal sequence codebook based on a size of the payload, a control message from the receiver to the transmitter, or a combination thereof, and transmitting the transmission to the receiver based on whether the transmission is to use the orthogonal sequence codebook or the non-orthogonal sequence codebook.

An apparatus for wireless communications at a transmitter is described. The apparatus may include a processor, memory coupled with the processor, and instructions stored in the memory. The instructions may be executable by the processor to cause the apparatus to identify a payload to include in a transmission to a receiver, determine to transmit the transmission using an orthogonal sequence codebook or a non-orthogonal sequence codebook based on a size of the payload, a control message from the receiver to the transmitter, or a combination thereof, and transmit the transmission to the receiver based on whether the transmission is to use the orthogonal sequence codebook or the non-orthogonal sequence codebook.

Another apparatus for wireless communications at a transmitter is described. The apparatus may include means for identifying a payload to include in a transmission to a receiver, means for determining to transmit the transmission using an orthogonal sequence codebook or a non-orthogonal sequence codebook based on a size of the payload, a control message from the receiver to the transmitter, or a combination thereof, and means for transmitting the transmission to the receiver based on whether the transmission is to use the orthogonal sequence codebook or the non-orthogonal sequence codebook.

A non-transitory computer-readable medium storing code for wireless communications at a transmitter is described. The code may include instructions executable by a processor to identify a payload to include in a transmission to a receiver, determine to transmit the transmission using an orthogonal sequence codebook or a non-orthogonal sequence codebook based on a size of the payload, a control message from the receiver to the transmitter, or a combination thereof, and transmit the transmission to the receiver based on whether the transmission is to use the orthogonal sequence codebook or the non-orthogonal sequence codebook.

In some examples of the method, apparatuses, and non-transitory computer-readable medium described herein, the transmission may be an UCI transmission.

In some examples of the method, apparatuses, and non-transitory computer-readable medium described herein, determining to transmit the transmission using the orthogonal sequence codebook or the non-orthogonal sequence codebook may include operations, features, means, or instructions for determining to transmit the UCI transmission using the orthogonal sequence codebook based on a number of bits of the payload being less than or equal to a computed threshold.

In some examples of the method, apparatuses, and non-transitory computer-readable medium described herein, the computed threshold includes a value of a logarithm base two of a number of resource elements in a resource available for the UCI transmission.

In some examples of the method, apparatuses, and non-transitory computer-readable medium described herein, determining to transmit the transmission using the orthogonal sequence codebook or the non-orthogonal sequence codebook may include operations, features, means, or instructions for determining to transmit the UCI transmission using the non-orthogonal sequence codebook based on a number of bits of the payload being greater than a computed threshold.

In some examples of the method, apparatuses, and non-transitory computer-readable medium described herein, the computed threshold includes a value of a logarithm base two of a number of resource elements in a resource available for the UCI transmission.

In some examples of the method, apparatuses, and non-transitory computer-readable medium described herein, determining to transmit the transmission using the orthogonal sequence codebook or the non-orthogonal sequence codebook may include operations, features, means, or instructions for receiving radio resource control (RRC) signaling from the receiver, where the RRC signaling includes a scalar value and determining to transmit the UCI transmission using the orthogonal sequence codebook based on a number of bits of the payload being less than or equal to a computed threshold weighted by the scalar value.

In some examples of the method, apparatuses, and non-transitory computer-readable medium described herein, the computed threshold weighted by the scalar value includes the scalar value multiplied by a logarithm base two of a number of resource elements in a resource available for the UCI transmission.

In some examples of the method, apparatuses, and non-transitory computer-readable medium described herein, determining to transmit the transmission using the orthogonal sequence codebook or the non-orthogonal sequence codebook may include operations, features, means, or instructions for receiving RRC signaling from the receiver, where the RRC signaling includes a scalar value and determining to transmit the UCI transmission using the non-orthogonal sequence codebook based on a number of bits of the payload being greater than a computed threshold weighted by the scalar value.

In some examples of the method, apparatuses, and non-transitory computer-readable medium described herein, the computed threshold weighted by the scalar value includes the scalar value multiplied by a logarithm base two of a number of resource elements in a resource available for the UCI transmission.

In some examples of the method, apparatuses, and non-transitory computer-readable medium described herein, determining to transmit the transmission using the orthogonal sequence codebook or the non-orthogonal sequence codebook may include operations, features, means, or instructions for receiving, from the receiver, an indication bit indicating that the transmitter may transmit the UCI transmission using one of the orthogonal sequence codebook or the non-orthogonal sequence codebook and determining to transmit the UCI transmission based on the indication bit.

Some examples of the method, apparatuses, and non-transitory computer-readable medium described herein may further include operations, features, means, or instructions for receiving, from the receiver, the indication bit in a field of a DCI transmission, where the DCI transmission schedules a set of resources for the UCI transmission in a physical uplink control channel (PUCCH).

Some examples of the method, apparatuses, and non-transitory computer-readable medium described herein may further include operations, features, means, or instructions for receiving, from the receiver, the indication bit as a field in a RRC signaling, where the RRC signaling configures the UCI transmission in a PUCCH.

In some examples of the method, apparatuses, and non-transitory computer-readable medium described herein, the transmission may be an uplink data transmission.

In some examples of the method, apparatuses, and non-transitory computer-readable medium described herein, determining to transmit the transmission using the orthogonal sequence codebook or the non-orthogonal sequence codebook may include operations, features, means, or instructions for determining to transmit the uplink data transmission using the orthogonal sequence codebook based on a number of bits of the payload being less than or equal to a computed threshold.

In some examples of the method, apparatuses, and non-transitory computer-readable medium described herein, the computed threshold includes a value of a logarithm base two of a number of resource elements in a resource available for the uplink data transmission.

In some examples of the method, apparatuses, and non-transitory computer-readable medium described herein, determining to transmit the transmission using the orthogonal sequence codebook or the non-orthogonal sequence codebook may include operations, features, means, or instructions for determining to transmit the uplink data transmission using the non-orthogonal sequence codebook based on a number of bits of the payload being greater than a computed threshold.

In some examples of the method, apparatuses, and non-transitory computer-readable medium described herein, the transmission includes a non-coherent UCI transmission.

In some examples of the method, apparatuses, and non-transitory computer-readable medium described herein, the transmission may be a downlink data transmission.

In some examples of the method, apparatuses, and non-transitory computer-readable medium described herein, determining to transmit the transmission using the orthogonal sequence codebook or the non-orthogonal sequence codebook may include operations, features, means, or instructions for determining to transmit the downlink data transmission using the orthogonal sequence codebook based on a number of bits of the payload being less than or equal to a computed threshold.

In some examples of the method, apparatuses, and non-transitory computer-readable medium described herein, determining to transmit the transmission using the orthogonal sequence codebook or the non-orthogonal sequence codebook may include operations, features, means, or instructions for determining to transmit the downlink data transmission using the non-orthogonal sequence codebook based on a number of bits of the payload being greater than a computed threshold.

In some examples of the method, apparatuses, and non-transitory computer-readable medium described herein, the transmission may be a DCI transmission.

In some examples of the method, apparatuses, and non-transitory computer-readable medium described herein, determining to transmit the transmission using the orthogonal sequence codebook or the non-orthogonal sequence codebook may include operations, features, means, or instructions for determining to transmit the DCI transmission using the orthogonal sequence codebook based on a number of bits of the payload being less than or equal to a computed threshold.

In some examples of the method, apparatuses, and non-transitory computer-readable medium described herein, determining to transmit the transmission using the orthogonal sequence codebook or the non-orthogonal sequence codebook may include operations, features, means, or instructions for determining to transmit the DCI transmission using the non-orthogonal sequence codebook based on a number of bits of the payload being greater than a computed threshold.

In some examples of the method, apparatuses, and non-transitory computer-readable medium described herein, determining to transmit the transmission using the orthogonal sequence codebook or the non-orthogonal sequence codebook may include operations, features, means, or instructions for receiving RRC signaling from the receiver, where the RRC signaling includes a scalar value and determining to transmit the DCI transmission using the orthogonal sequence codebook based on a number of bits of the payload being less than or equal to a computed threshold weighted by the scalar value.

In some examples of the method, apparatuses, and non-transitory computer-readable medium described herein, determining to transmit the transmission using the orthogonal sequence codebook or the non-orthogonal sequence codebook may include operations, features, means, or instructions for receiving RRC signaling from the receiver, where the RRC signaling includes a scalar value and determining to transmit the DCI transmission using the non-orthogonal sequence codebook based on a number of bits of the payload being greater than a computed threshold weighted by the scalar value.

In some examples of the method, apparatuses, and non-transitory computer-readable medium described herein, determining to transmit the transmission using the orthogonal sequence codebook or the non-orthogonal sequence codebook may include operations, features, means, or instructions for receiving, from the receiver, an indication bit indicating that the transmitter may be to transmit the DCI transmission using one of the orthogonal sequence codebook or the non-orthogonal sequence codebook and determining to transmit the DCI transmission based on the indication bit.

A method for wireless communications at a transmitter is described. The method may include identifying a payload to include in a transmission to a receiver, determining to transmit the transmission using an orthogonal sequence codebook or a non-orthogonal sequence codebook based on a size of the payload, a control message from the receiver to the transmitter, or a combination thereof, and transmitting the transmission to the receiver based on whether the transmission is to use the orthogonal sequence codebook or the non-orthogonal sequence codebook.

An apparatus for wireless communications at a transmitter is described. The apparatus may include a processor, memory coupled with the processor, and instructions stored in the memory. The instructions may be executable by the processor to cause the apparatus to identify a payload to include in a transmission to a receiver, determine to transmit the transmission using an orthogonal sequence codebook or a non-orthogonal sequence codebook based on a size of the payload, a control message from the receiver to the transmitter, or a combination thereof, and transmit the transmission to the receiver based on whether the transmission is to use the orthogonal sequence codebook or the non-orthogonal sequence codebook.

Another apparatus for wireless communications at a transmitter is described. The apparatus may include means for identifying a payload to include in a transmission to a receiver, means for determining to transmit the transmission using an orthogonal sequence codebook or a non-orthogonal sequence codebook based on a size of the payload, a control message from the receiver to the transmitter, or a combination thereof, and means for transmitting the transmission to the receiver based on whether the transmission is to use the orthogonal sequence codebook or the non-orthogonal sequence codebook.

A non-transitory computer-readable medium storing code for wireless communications at a transmitter is described. The code may include instructions executable by a processor to identify a payload to include in a transmission to a receiver, determine to transmit the transmission using an orthogonal sequence codebook or a non-orthogonal sequence codebook based on a size of the payload, a control message from the receiver to the transmitter, or a combination thereof, and transmit the transmission to the receiver based on whether the transmission is to use the orthogonal sequence codebook or the non-orthogonal sequence codebook.

A method for wireless communications at a transmitter is described. The method may include identifying a payload to include in a transmission to a receiver, determining to transmit the transmission using an orthogonal sequence codebook or a non-orthogonal sequence codebook based on a size of the payload, a control message from the receiver to the transmitter, or a combination thereof, and transmitting the transmission to the receiver based on whether the transmission is to use the orthogonal sequence codebook or the non-orthogonal sequence codebook.

An apparatus for wireless communications at a transmitter is described. The apparatus may include a processor, memory coupled with the processor, and instructions stored in the memory. The instructions may be executable by the processor to cause the apparatus to identify a payload to include in a transmission to a receiver, determine to transmit the transmission using an orthogonal sequence codebook or a non-orthogonal sequence codebook based on a size of the payload, a control message from the receiver to the transmitter, or a combination thereof, and transmit the transmission to the receiver based on whether the transmission is to use the orthogonal sequence codebook or the non-orthogonal sequence codebook.

Another apparatus for wireless communications at a transmitter is described. The apparatus may include means for identifying a payload to include in a transmission to a receiver, means for determining to transmit the transmission using an orthogonal sequence codebook or a non-orthogonal sequence codebook based on a size of the payload, a control message from the receiver to the transmitter, or a combination thereof, and means for transmitting the transmission to the receiver based on whether the transmission is to use the orthogonal sequence codebook or the non-orthogonal sequence codebook.

A non-transitory computer-readable medium storing code for wireless communications at a transmitter is described. The code may include instructions executable by a processor to identify a payload to include in a transmission to a receiver, determine to transmit the transmission using an orthogonal sequence codebook or a non-orthogonal sequence codebook based on a size of the payload, a control message from the receiver to the transmitter, or a combination thereof, and transmit the transmission to the receiver based on whether the transmission is to use the orthogonal sequence codebook or the non-orthogonal sequence codebook.

DETAILED DESCRIPTION

Some wireless communications systems may use demodulation reference signals (DMRS) in order to configure a device (e.g., a user equipment (UE)) to perform channel estimation. The device may be a transmitter, which may then use the estimated channel to perform demodulation. In such a system, the DMRS and data may be transmitted by a base station, while receipt of the data at a device may be based on channel estimation and coherent demodulation and decoding.

In some cases, the channel may be associated with a low signal to noise ratio (SNR). In these cases, noncoherent transmission without DMRS transmission may improve efficiency, and avoid performance degradation in demodulating and decoding. A device may thus transmit a payload in a transmission (e.g. uplink control information (UCI) transmission or downlink control information (DCI) transmission) to a base station as a noncoherent transmission.

The wireless device may receive an indication of a channel resource in which to transmit the payload in the transmission. The transmission may include an uplink control transmission, an uplink data transmission, a downlink control transmission, or a downlink data transmission. The resource may include a grid of time and frequency resources (e.g., a resource block), as well as K number of bits on which to transmit the payload on. The device may construct a sequence codebook with a size $2^K$, where K is the number of bits of the payload. In order to transmit a payload of K bits (e.g., a payload of $\{b_0, b_1, b_2, \ldots, b_{K-1}\}$), the device may convert the payload bit stream into a decimal number k, and transmit the $k^{th}$ codepoint in the constructed codebook. The device may transmit the payload in the transmission using an orthogonal sequence codebook or a non-orthogonal sequence codebook.

The device may determine whether to transmit the payload in the transmission using the orthogonal sequence codebook or the non-orthogonal sequence codebook based on a number of factors. The device may determine which codebook to use based on a size of the payload, control signaling from the base station, or both.

Similarly, a base station expecting to receive the transmission from the device may be enabled to perform the same determination as the device such that another device (e.g., a receiver) is aware of whether the transmission will use an orthogonal sequence codebook or a non-orthogonal sequence codebook.

Aspects of the disclosure are initially described in the context of wireless communications systems. Aspects of the disclosure are then described with respect to process flows. Aspects of the disclosure are further illustrated by and described with reference to apparatus diagrams, system diagrams, and flowcharts that relate to switching orthogonal and non-orthogonal sequence based noncoherent uplink control transmissions.

Figure 1:
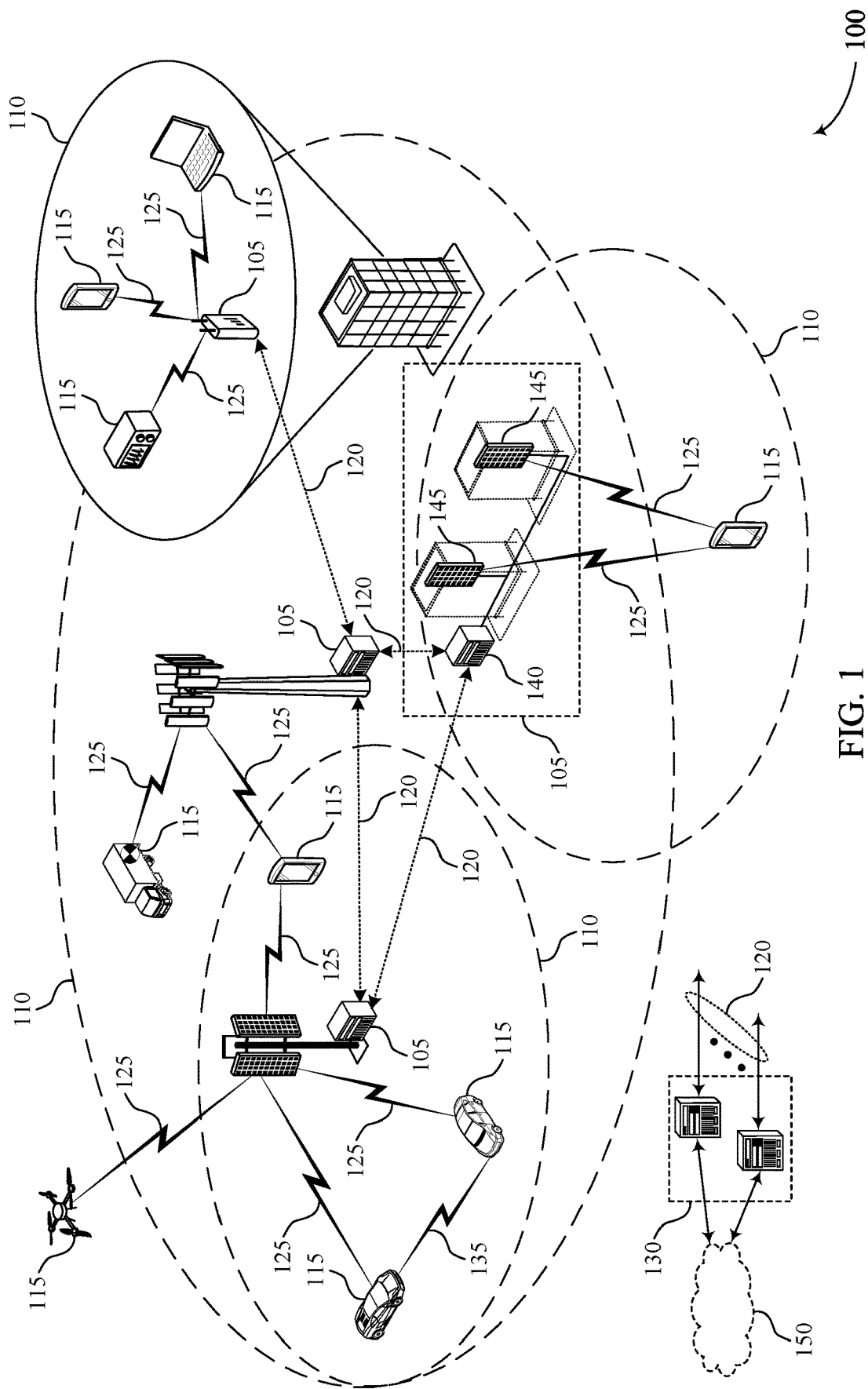
FIG. 1 illustrates an example of a wireless communications system that supports switching orthogonal and non-orthogonal sequence based noncoherent uplink control transmissions in accordance with various aspects of the present disclosure.

FIG. 1 illustrates an example of a wireless communications system 100 that supports switching orthogonal and non-orthogonal sequence based noncoherent uplink control transmissions in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), unlicensed radio frequency spectrum band radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may schedule a user equipment 115 to transmit a payload in a transmission to the base station 105 in a wireless communications system. The UE 115 may be an example of a transmitter. The base station 105 may be an example of a receiver. The UE 115 may identify a payload to include in the transmission to the base station 105. The UE 115 may determine to transmit the transmission using an orthogonal sequence codebook or a non-orthogonal sequence codebook, based on a size of the payload, a control message from the base station 105 to the UE 115, or a combination of these. The UE 115 may then transmit the transmission to the base station 105 based on whether the transmission is to use the orthogonal sequence codebook or the non-orthogonal sequence codebook. The transmission may be an UCI transmission, an uplink data transmission, a DCI transmission, or a downlink data transmission. The transmission may be a noncoherent transmission.

Figure 2A:
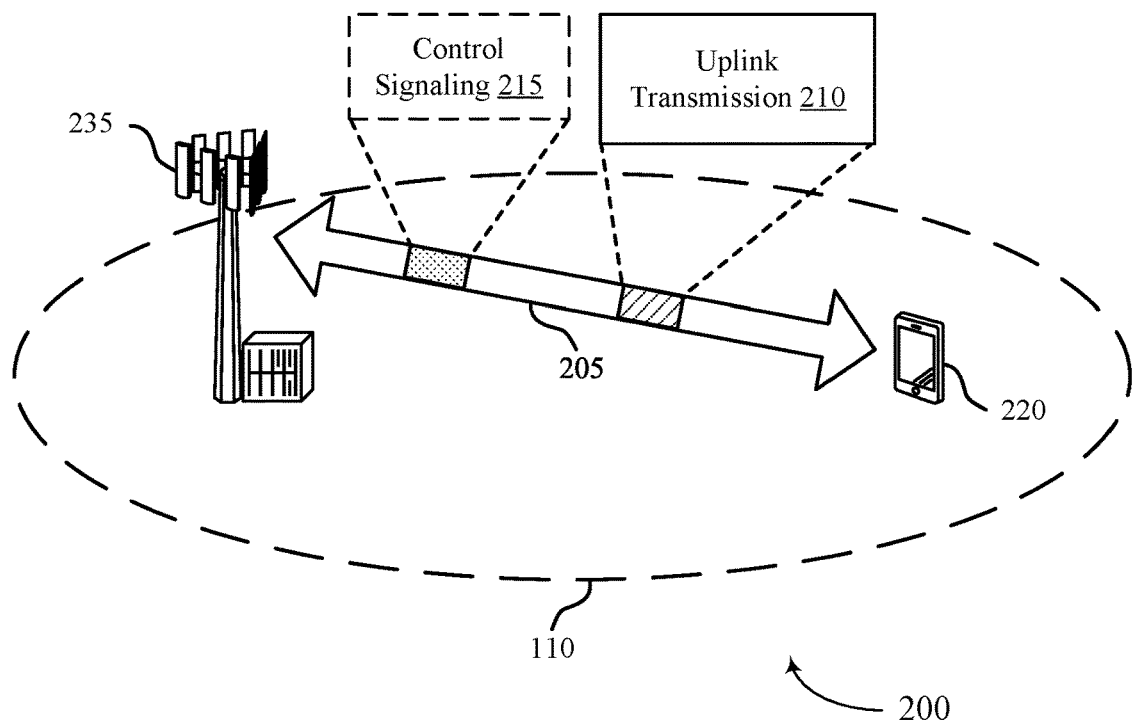
FIGS. 2A and 2B illustrate examples of wireless communications systems that support switching orthogonal and non-orthogonal sequence based noncoherent transmissions in accordance with various aspects of the present disclosure.
Figure 2B:
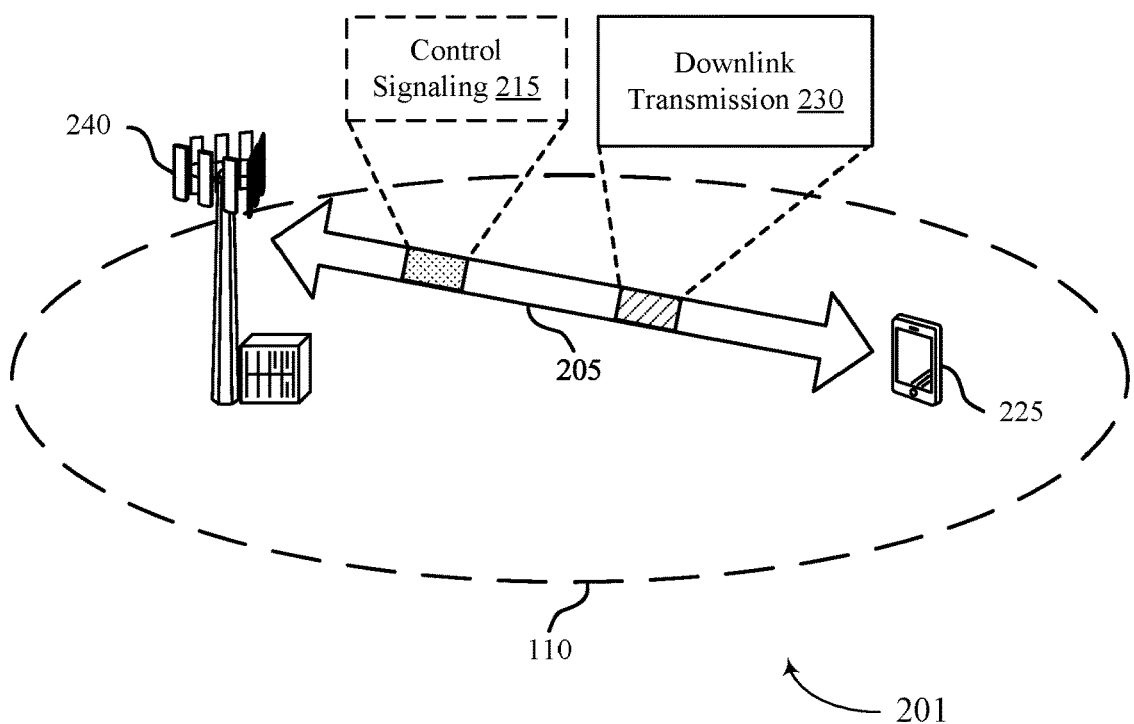

FIGS. 2A and 2B illustrate examples of wireless communications systems 200 and 201 respectively, that support switching orthogonal and non-orthogonal sequence based noncoherent transmissions in accordance with various aspects of the present disclosure.

FIG. 2A illustrates an example of a wireless communications system that supports switching orthogonal and non-orthogonal sequence based noncoherent uplink transmissions in accordance with various aspects of the present disclosure. In some examples, wireless communications system 200 may implement aspects of wireless communication system 100. Wireless communications system 200 may include a transmitter 220, which may be an example of a UE 115 as described with respect to FIG. 1. Wireless communications system 200 may also include a receiver 235, which may be an example of a base station 105 as described with respect to FIG. 1.

Transmitter 220 and receiver 235 may communicate over channel 205. Receiver 235 may serve one or more transmitters 220 in coverage area 110. Receiver 235 may transmit to transmitter 220 an indication of an assigned uplink channel (e.g. physical uplink control channel (PUCCH) or physical uplink shared channel (PUSCH)) resource in which to transmit a payload in the uplink transmission 210. The uplink channel resource may include a grid of time and frequency resources (e.g., a resource block), as well as K number of bits that transmitter 220 may use on which to transmit the payload in the uplink transmission 210. Transmitter 220 may construct a sequence codebook with a size $2^K$, where K is the number of bits of the uplink payload. In order to transmit a payload of K bits (e.g., a payload of $\{b_0, b_1, b_2, \ldots, b_{K-1}\}$), transmitter 220 may convert the payload bit stream into a decimal number k, and transmit the $k^{th}$ codepoint in the constructed codebook. Transmitter 220 may transmit the payload in the uplink transmission 210 using an orthogonal sequence codebook or a non-orthogonal sequence codebook.

In the allocated uplink channel (e.g. PUCCH or PUSCH) resource, there may be M frequency tones and N OFDM symbols. In cases where transmitter 220 uses an orthogonal frequency codebook, the codebook size may be less than or equal to N*M, where the number of bits that can be transmitted is less than or equal to a floor function of a logarithm base two of N*M. The floor function may round the result down to the nearest whole number.

In cases where transmitter 220 uses a non-orthogonal frequency codebook, the codebook size may be greater than N*M, where the number of bits that can be transmitted is greater than a floor function of a logarithm base two of N*M.

Transmitter 220 may determine whether to transmit uplink transmission 210 using an orthogonal sequence codebook or a non-orthogonal sequence codebook based on a number of factors. Transmitter 220 may determine whether to use the orthogonal sequence codebook or the non-orthogonal sequence codebook based on a size of the uplink payload, control signaling from receiver 235, or a combination of these.

In a first case, transmitter 220 may determine whether to use the orthogonal sequence codebook or the non-orthogonal sequence codebook based on a size of the uplink payload. If the number of bits of the uplink payload is less than or equal to a logarithm base two of the number of resource elements in the allocated uplink channel (e.g. PUCCH or PUSCH) resource, then transmitter 220 may determine to use the orthogonal sequence codebook for uplink transmission 210. If the number of bits of the uplink payload is greater than a logarithm base two of the number of resource elements in the allocated uplink channel (e.g. PUCCH or PUSCH) resource, then transmitter 220 may determine to use the non-orthogonal sequence codebook for uplink transmission 210.

In a second case, transmitter 220 may determine whether to use the orthogonal sequence codebook or the non-orthogonal sequence codebook based on the size of the uplink payload and based on control signaling 215 from receiver 235. In some cases, receiver 235 may transmit control signaling 215 including a scalar number (e.g., alpha). The scalar number may be greater than zero and less than or equal to one. Then, if the number of bits of the uplink payload is less than or equal to the scalar number multiplied by the logarithm base two of the number of resource elements in the uplink channel (e.g. PUCCH or PUSCH) resource, then transmitter 220 may use the orthogonal sequence codebook to perform noncoherent transmission of uplink transmission 210. If the number of bits of the uplink payload is greater than the scalar number multiplied by the logarithm base two of the number of resource elements in the uplink channel (e.g. PUCCH or PUSCH) resource, then transmitter 220 may use the non-orthogonal sequence codebook to perform noncoherent transmission of uplink transmission 210.

Receiver 235 may perform channel measurements to determine the scalar number alpha transmitted in control signaling 215. The measurements may include a measurement of Doppler shift of channel 205 or a measurement of the delay spread of channel 205, or both. For example, orthogonal sequence-based uplink transmission may be more susceptible to interference caused by Doppler shift or the delay spread, and non-orthogonal sequence based uplink transmission may be less susceptible to Doppler shift and delay spread. Thus, receiver 235 may determine a scalar number alpha, such that receiver 235 may control performance and reliability of the uplink transmission 210, based on the measured Doppler shift, delay spread, or both.

In a third case, transmitter 220 may determine whether to use the orthogonal sequence codebook or the non-orthogonal sequence codebook based on control signaling 215 from receiver 235, without consideration of the size of the uplink payload. Receiver 235 may signal an indication bit in control signaling 215 to signal an uplink channel (e.g. PUCCH or PUSCH) in which to use either the orthogonal sequence codebook or the non-orthogonal sequence codebook. In cases where receiver 235 dynamically schedules the uplink channel (e.g. PUCCH or PUSCH), the one bit indication signaling may be included as a field in a DCI message scheduling the uplink channel (e.g. PUCCH or PUSCH) transmission. In cases where receiver 235 semi-statically configures uplink channel (e.g. PUCCH or PUSCH), the one bit indication signaling may be included as a field in RRC signaling used to configure the uplink channel (e.g. PUCCH or PUSCH) transmission.

FIG. 2B illustrates an example of a wireless communications system that supports switching orthogonal and non-orthogonal sequence based noncoherent downlink transmissions in accordance with various aspects of the present disclosure. In some examples, wireless communications system 201 may implement aspects of wireless communication system 100. Wireless communications system 201 may include a transmitter 240, which may be an example of a base station 105 as described with respect to FIG. 1. Wireless communications system 201 may also include a receiver 225, which may be an example of a UE 115 as described with respect to FIG. 1.

Receiver 225 and transmitter 240 may communicate over channel 205. Transmitter 240 may serve one or more receivers 225 in coverage area 110. Transmitter 240 may determine an assigned downlink channel (e.g. physical downlink control channel (PDCCH) or physical downlink shared channel (PDSCH)) resource in which to transmit a payload in a downlink transmission 230 to receiver 225. The downlink channel (e.g. PDCCH or PDSCH) resource may include a grid of time and frequency resources (e.g., a resource block), as well as K number of bits that transmitter 240 may use on which to transmit the payload in the downlink transmission 230. Transmitter 240 may construct a sequence codebook as described in detail in FIG. 2A. Transmitter 240 may transmit the payload in the downlink transmission 230 using an orthogonal sequence codebook or a non-orthogonal sequence codebook.

In the allocated downlink channel (e.g. PDCCH or PDSCH) resource, there may be M frequency tones and N OFDM symbols. In cases where transmitter 240 uses an orthogonal frequency codebook, the codebook size may be less than or equal to $N*M$, where the number of bits that can be transmitted is less than or equal to a floor function of a logarithm base two of $N*M$ The floor function may round the result down to the nearest whole number.

In cases where transmitter 240 uses a non-orthogonal frequency codebook, the codebook size may be greater than $N*M$, where the number of bits that can be transmitted is greater than a floor function of a logarithm base two of $N*M$.

Transmitter 240 may determine whether to transmit downlink transmission 230 using an orthogonal sequence codebook or a non-orthogonal sequence codebook based on a number of factors. Transmitter 240 may determine whether to use the orthogonal sequence codebook or the non-orthogonal sequence codebook based on a size of the downlink payload, control signaling from transmitter 240, or a combination of these.

In a first case, transmitter 240 may determine whether to use the orthogonal sequence codebook or the non-orthogonal sequence codebook based on a size of the downlink payload. If the number of bits of the downlink payload is less than or equal to a logarithm base two of the number of resource elements in the allocated downlink channel (e.g. PDCCH or PDSCH) resource, then transmitter 240 may determine to use the orthogonal sequence codebook for downlink transmission 230. If the number of bits of the downlink payload is greater than a logarithm base two of the number of resource elements in the allocated downlink channel (e.g. PDCCH or PDSCH) resource, then transmitter 240 may determine to use the non-orthogonal sequence codebook for downlink transmission 230.

In a second case, transmitter 240 may determine whether to use the orthogonal sequence codebook or the non-orthogonal sequence codebook based on the size of the downlink payload and based on a scalar number determined by transmitter 240. The scalar number may be greater than zero and less than or equal to one and transmitter 240 may transmit the scalar number to receiver 225 using control signaling 215. If the number of bits of the downlink payload is less than or equal to the scalar number multiplied by the logarithm base two of the number of resource elements in the downlink channel (e.g. PDCCH or PDSCH) resource, then transmitter 240 may use the orthogonal sequence codebook to perform noncoherent transmission of downlink transmission 230. If the number of bits of the downlink payload is greater than the scalar number multiplied by the logarithm base two of the number of resource elements in the downlink channel (e.g. PDCCH or PDSCH) resource, then transmitter 240 may use the non-orthogonal sequence codebook to perform noncoherent transmission of downlink transmission 230.

Transmitter 240 may perform channel measurements to determine the scalar number alpha transmitted in control signaling 215. The measurements may include a measurement of Doppler shift of channel 205 or a measurement of the delay spread of channel 205-b, or both. For example, orthogonal sequence-based downlink transmission may be more susceptible to interference caused by Doppler shift or the delay spread, and non-orthogonal sequence based downlink transmission may be less susceptible to Doppler shift and delay spread. Thus, transmitter 240 may determine a scalar number alpha, such that transmitter 240 may control performance and reliability of the downlink transmission 230, based on the measured Doppler shift, delay spread, or both.

In a third case, transmitter 240 may determine whether to use the orthogonal sequence codebook or the non-orthogonal sequence codebook based on an indication bit received from receiver 225, without consideration of the size of the downlink payload. Receiver 225 may signal an indication bit in control signaling 215 to signal whether to use either the orthogonal sequence codebook or the non-orthogonal sequence codebook. In cases where transmitter 240 dynamically schedules the downlink channel (e.g. PDCCH or PDSCH), the one bit indication signaling may be included as a field in a DCI message scheduling the downlink channel (e.g. PDCCH or PDSCH) transmission. In cases where transmitter 240 semi-statically configures downlink channel (e.g. PDCCH or PDSCH), the one bit indication signaling may be included as a field in RRC signaling used to configure the downlink channel (e.g. PDCCH or PDSCH) transmission.

In each of the three cases described herein, as they apply to both uplink and downlink transmissions, the base station may also engage in a similar determination so that the base station is aware of whether the transmission (e.g. uplink or downlink) will use an orthogonal sequence codebook or a non-orthogonal sequence codebook. In addition, each of the described three cases may be applied to any payload of a transmission, as well as payloads associated with both UCI and DCI.

Figure 3:
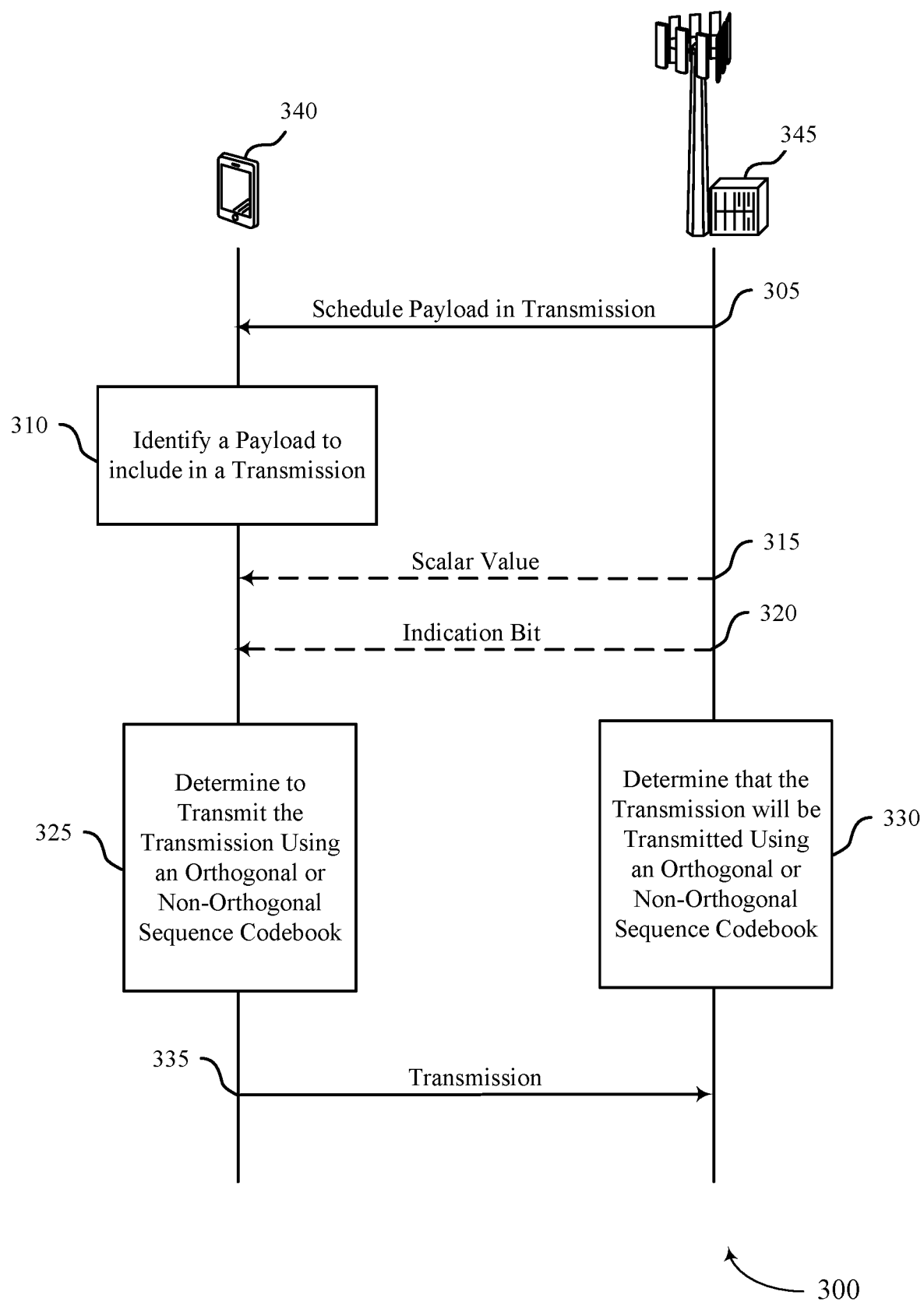
FIG. 3 illustrates an example of a process flow that supports switching orthogonal and non-orthogonal sequence based noncoherent uplink control transmissions in accordance with various aspects of the present disclosure.

FIG. 3 illustrates an example of a process flow 300 that supports switching orthogonal and non-orthogonal sequence based noncoherent transmissions in accordance with various aspects of the present disclosure. In some examples, process flow 300 may implement aspects of wireless communication systems 100, 200, and 201. Process flow 300 may include transmitter 340 and receiver 345, which may each be an example of a UE 115 or a base station 105 as described with respect to FIGS. 1, 2A and 2B.

At 305, receiver 345 may schedule transmitter 340 to transmit a payload in a transmission (e.g. uplink, downlink, UCI, DCI transmission). Receiver 345 may schedule the transmission by transmitting control signaling to transmitter 340.

At 310, transmitter 340 may identify a payload to include in a transmission to receiver 345. In some cases, the transmission may be a UCI transmission. In some cases, the transmission is an uplink data transmission. In some cases, the transmission is a downlink control transmission. In some cases, the transmission is a downlink data transmission.

At 325, transmitter 340 may determine to transmit the transmission using an orthogonal sequence codebook or a non-orthogonal sequence codebook based on a size of the payload, a control message from receiver 345 to transmitter 340, or a combination of these. The transmission may be a noncoherent transmission. At 330, receiver 345 may also determine that the transmission will be transmitted by transmitter 340 using an orthogonal sequence codebook or a non-orthogonal sequence codebook.

In a first case, transmitter 340 may determine to transmit the transmission using the orthogonal sequence codebook or the non-orthogonal sequence codebook based on the size of the payload. In these cases, transmitter 340 may determine to transmit the transmission using the orthogonal sequence codebook based on whether or not a number of bits of the payload satisfies a computed threshold. The computed threshold may be a value of a logarithm base two of a number of resource elements in a resource available for the transmission. In cases where the number of bits of the payload is less than or equal to the computed threshold, transmitter 340 may determine to transmit the transmission using the orthogonal sequence codebook. In cases where the number of bits of the payload is greater than the computed threshold, transmitter 340 may determine to transmit the transmission using the non-orthogonal sequence codebook. Receiver 345 may also determine which codebook will be used based on the same parameters.

In a second case, transmitter 340 may determine to transmit the transmission using the orthogonal sequence codebook or the non-orthogonal sequence codebook based on receiving control signaling from receiver 345 and based on the size of the payload. In some cases, at 315, transmitter 340 may receive RRC signaling from receiver 345, where the RRC signaling includes a scalar value. In some cases, receiver 345 may determine a Doppler shift, a delay spread, or both, of the channel (e.g. PUCCH, PUSCH, PDCCH, PDSCH), and the scalar value may be determined by receiver 345 based on the Doppler shift, the delay spread, or both.

Then, at 325, transmitter 340 may determine whether to transmit using the orthogonal sequences codebook or using the non-orthogonal sequence codebook based on whether a number of bits of the payload satisfies a computed threshold weighted by the scalar value. The computed threshold weighted by the scalar value may include the scalar value multiplied by a logarithm base two of a number of resource elements in a resource available for the transmission. In cases where the number of bits of the payload is less than or equal to the computed threshold weighted by the scalar value, transmitter 340 may determine to transmit the transmission using the orthogonal sequence codebook. In cases where the number of bits of the payload is greater than the computed threshold weighted by the scalar value, transmitter 340 may determine to transmit the transmission using the non-orthogonal sequence codebook. Receiver 345 may also determine which codebook will be used based on the same parameters.

In a third case, transmitter 340 may determine whether to transmit the transmission using the orthogonal sequence codebook or the non-orthogonal sequence codebook based on an indication bit received from receiver 345. At 320, receiver 345 may transmit an indication bit indicating that transmitter 340 is to transmit the transmission using one of the orthogonal sequence codebook or the non-orthogonal sequence codebook. Transmitter 340 may receive the indication bit in a field of a DCI transmission, where the DCI transmission schedules a set of resources for the transmission in a PUCCH. In other cases, transmitter 340 may receive the indication bit as a field in RRC signaling where the RRC signaling configures the transmission in a PUCCH. In some cases, receiver 345 may determine a Doppler shift, a delay spread, or both, of the channel, and the indication bit may be determined by receiver 345 based on the Doppler shift, the delay spread, or both. Then, at 325, transmitter 340 may determine to transmit the transmission using either orthogonal or non-orthogonal sequence codebooks based on the indication bit. Receiver 345 may also determine which codebook will be used based on the same parameters.

At 335, transmitter 340 may transmit the transmission to receiver 345 based on whether the transmission is to use the orthogonal sequence codebook or the non-orthogonal sequence codebook. The transmission may be a noncoherent transmission. The receiver 345 will be aware of whether the transmission is transmitted via an orthogonal sequence codebook or a non-orthogonal sequence codebook as the receiver 345 will have made the same determination as transmitter 340 at 330. If transmitter 340 had used the first case described above to determine whether to use an orthogonal sequence codebook or a non-orthogonal sequence codebook based on a computed threshold, the receiver 345 would also use the same method—the receiver 345 would be aware of the payload size of the transmission in order to use as an input in its computations. The receiver 345 could similarly perform the second case method based on its own knowledge of the weighting factor and the payload size of the transmission. In the third case, the receiver 345 would be aware due to it having signaled the transmitter 340 whether to use an orthogonal or non-orthogonal sequence codebook.

Figure 4:
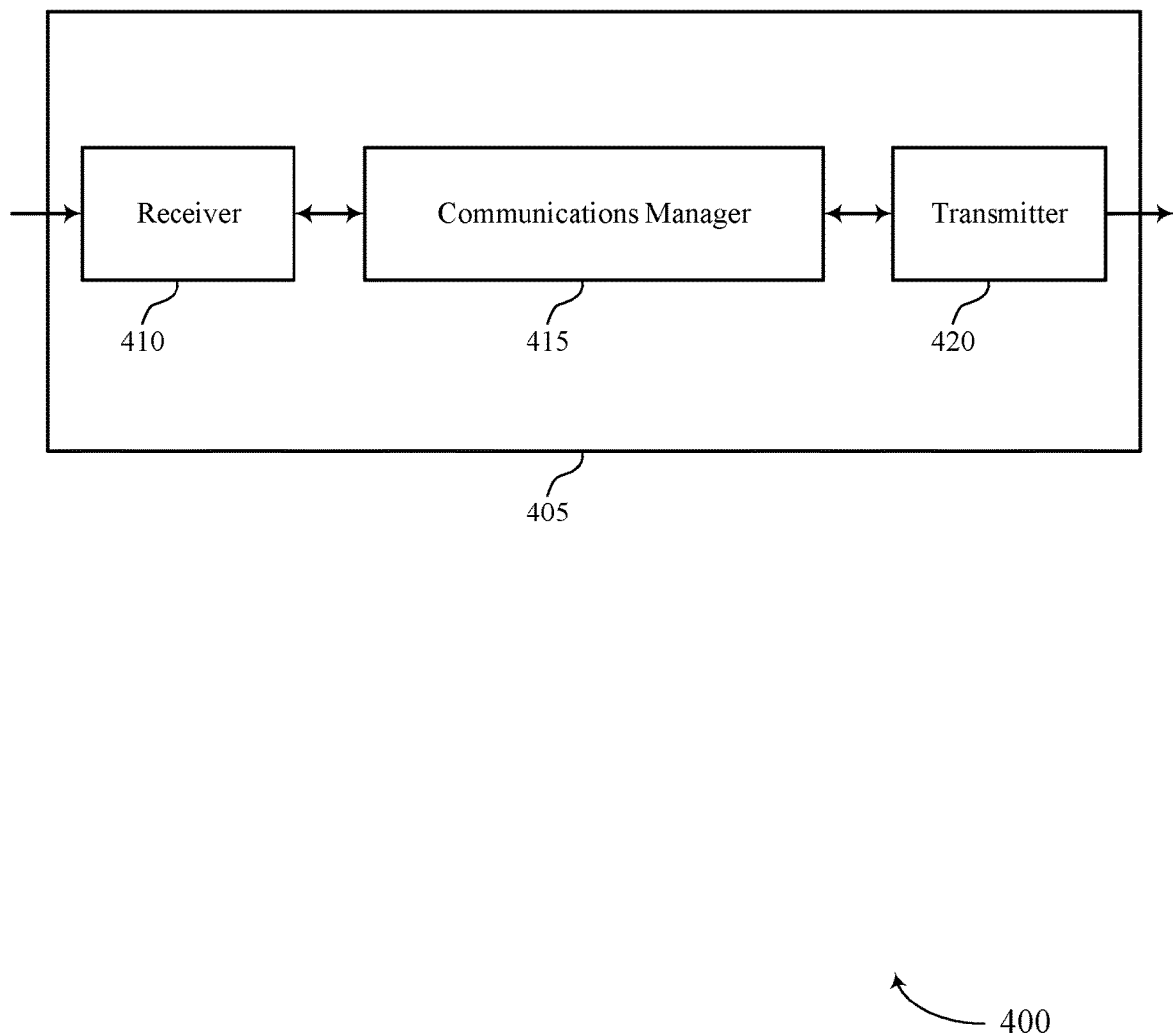
FIGS. 4 and 5 show block diagrams of devices that support switching orthogonal and non-orthogonal sequence based noncoherent uplink control transmissions in accordance with various aspects of the present disclosure.

FIG. 4 shows a block diagram 400 of a device 405 that supports switching orthogonal and non-orthogonal sequence based noncoherent uplink control transmissions in accordance with various aspects of the present disclosure. The device 405 may be an example of aspects of a UE 115 as described herein. The device 405 may include a receiver 410, a transmitter 420, and a communications manager 415. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to switching orthogonal and non-orthogonal sequence based noncoherent uplink control transmissions). Information may be passed on to other components of the device 405. The receiver 410 may utilize a single antenna or a set of multiple antennas.

The transmitter 420 may provide a means for transmitting signals generated by other components of the device 405. For example, the transmitter 420 may transmit information such as packets, user data, control information, or any combination thereof associated with various information channels (e.g., control channels, data channels, information channels related to switching orthogonal and non-orthogonal sequence based noncoherent uplink control transmissions). In some examples, the transmitter 420 may be co-located with a receiver 410 in a transceiver component. The transmitter 420 may utilize a single antenna or a set of multiple antennas.

The communications manager 415, the receiver 410, the transmitter 420, or various combinations thereof or various components thereof may be examples of means for performing various aspects of switching orthogonal and non-orthogonal sequence based noncoherent uplink control transmissions as described herein. For example, the communications manager 415, the receiver 410, the transmitter 420, or various combinations or components thereof may support a method for performing one or more of the functions described herein.

In some examples, the communications manager 415, the receiver 410, the transmitter 420, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 415, the receiver 410, the transmitter 420, or various combinations or components thereof may be implemented in code (e.g., as communications management software or firmware) executed by a processor. If implemented in code executed by a processor, the functions of the communications manager 415, the receiver 410, the transmitter 420, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 415 may be configured to perform various operations (e.g., receiving, monitoring, transmitting) using or otherwise in cooperation with the receiver 410, the transmitter 420, or both. For example, the communications manager 415 may receive information from the receiver 410, send information to the transmitter 420, or be integrated in combination with the receiver 410, the transmitter 420, or both to receive information, transmit information, or perform various other operations as described herein.

The communications manager 415 may support wireless communications at a transmitter in accordance with examples as disclosed herein. For example, the communications manager 415 may be configured as or otherwise support a means for identifying a payload to include in a transmission to a receiver. The communications manager 415 may be configured as or otherwise support a means for determining to transmit the transmission using an orthogonal sequence codebook or a non-orthogonal sequence codebook based on a size of the payload, a control message from the receiver to the transmitter, or a combination thereof. The communications manager 415 may be configured as or otherwise support a means for transmitting the transmission to the receiver based on whether the transmission is to use the orthogonal sequence codebook or the non-orthogonal sequence codebook.

By including or configuring the communications manager 415 in accordance with examples as described herein, the device 405 (e.g., a processor controlling or otherwise coupled to the receiver 410, the transmitter 420, the communications manager 415, or a combination thereof) may support techniques for improving communications efficiency and decreasing latency. The transmitting device may efficiently determine to transmit a transmission based on a sequence codebook. The device may thus transmit transmission to a receiver based on a threshold, improving communications efficiency.

Figure 5:
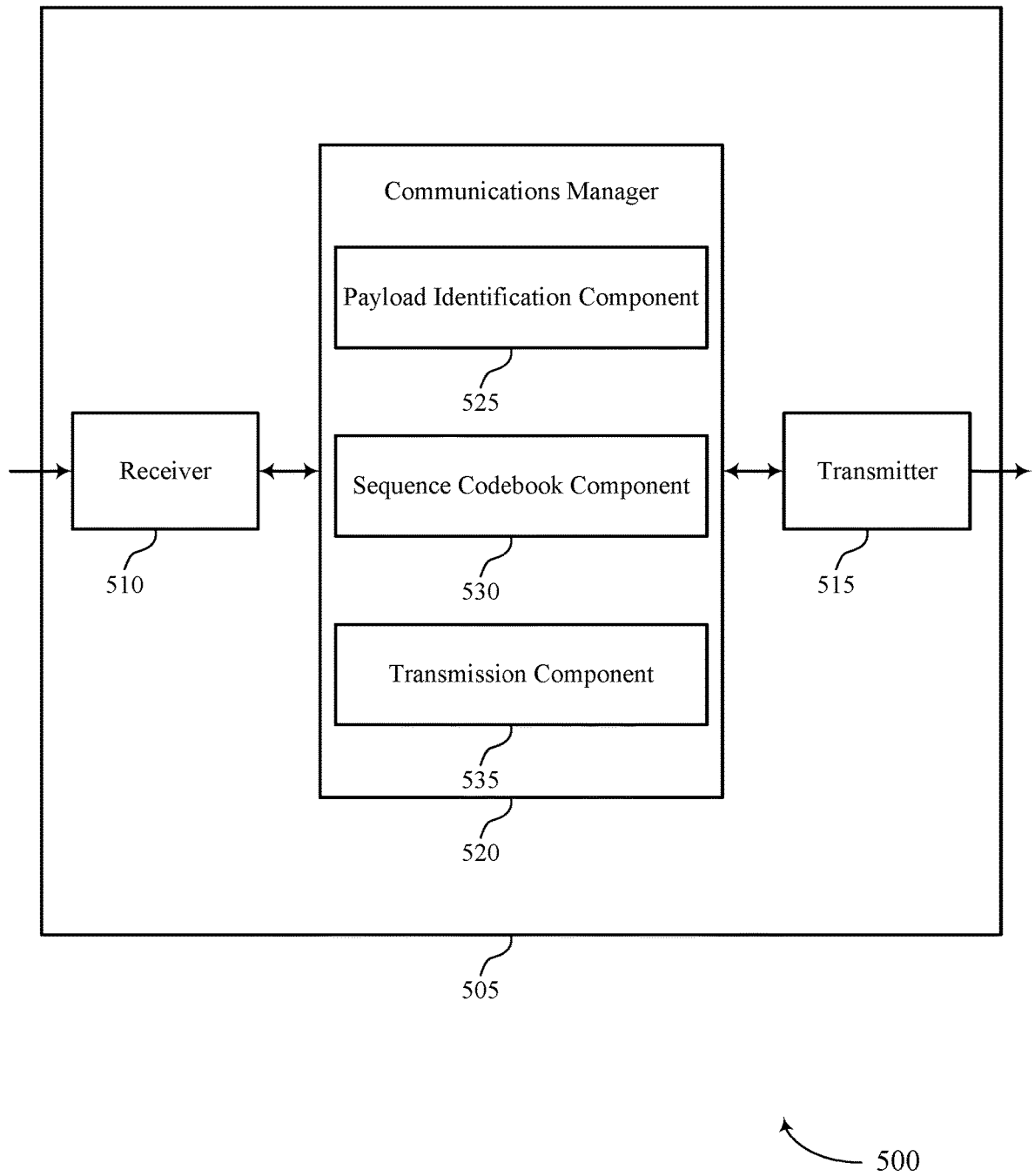

FIG. 5 shows a block diagram 500 of a device 505 that supports switching orthogonal and non-orthogonal sequence based noncoherent uplink control transmissions in accordance with various aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to switching orthogonal and non-orthogonal sequence based noncoherent uplink control transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to switching orthogonal and non-orthogonal sequence based noncoherent uplink control transmissions). In some examples, the transmitter 515 may be co-located with a receiver 510 in a transceiver component. The transmitter 515 may utilize a single antenna or a set of multiple antennas.

The device 505, or various components thereof, may be an example of means for performing various aspects of switching orthogonal and non-orthogonal sequence based noncoherent uplink control transmissions as described herein. For example, the communications manager 520 may include a payload identification component 525, a sequence codebook component 530, a transmission component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a transmitter in accordance with examples as disclosed herein. The payload identification component 525 may be configured as or otherwise support a means for identifying a payload to include in a transmission to a receiver. The sequence codebook component 530 may be configured as or otherwise support a means for determining to transmit the transmission using an orthogonal sequence codebook or a non-orthogonal sequence codebook based on a size of the payload, a control message from the receiver to the transmitter, or a combination thereof. The transmission component 535 may be configured as or otherwise support a means for transmitting the transmission to the receiver based on whether the transmission is to use the orthogonal sequence codebook or the non-orthogonal sequence codebook.

Figure 6:
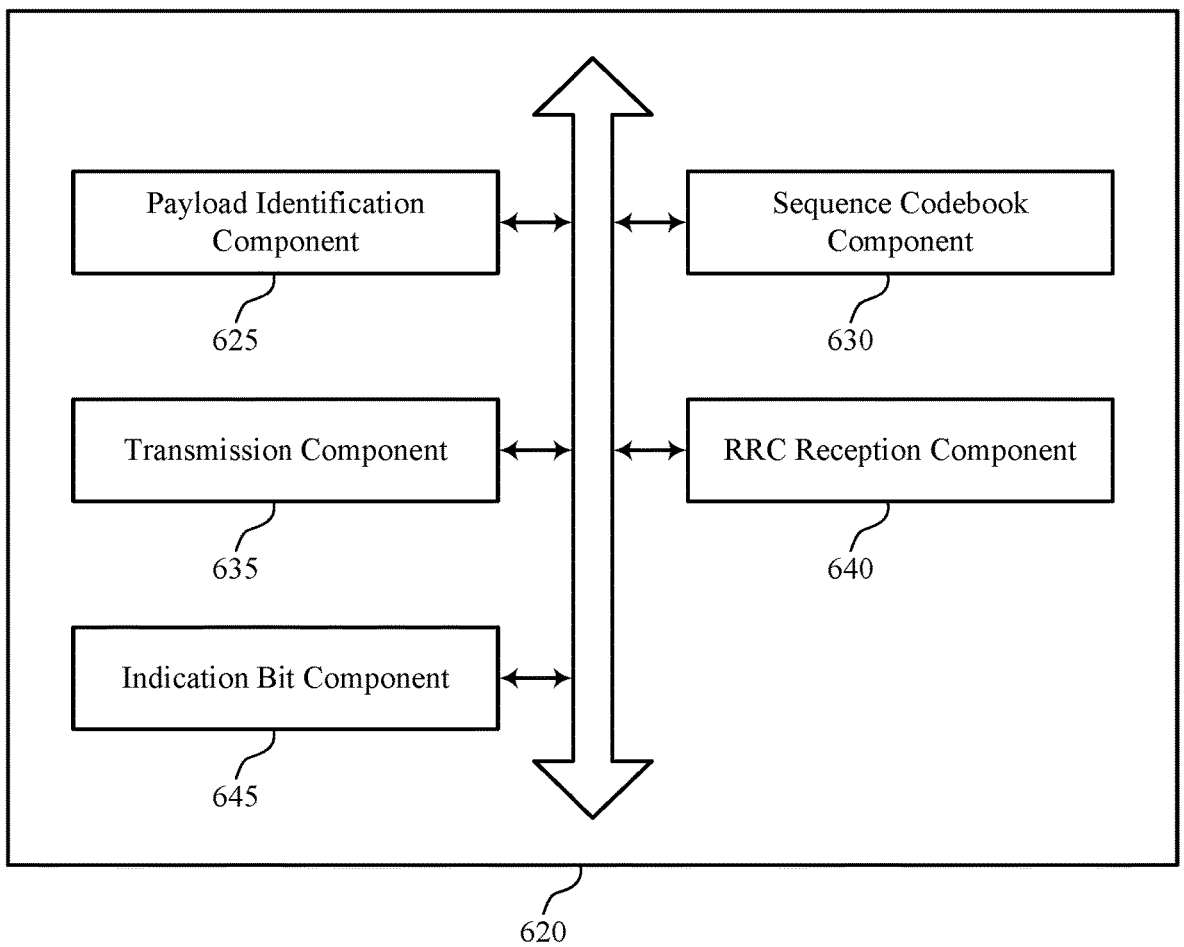
FIG. 6 shows a block diagram of a communications manager that supports switching orthogonal and non-orthogonal sequence based noncoherent uplink control transmissions in accordance with various aspects of the present disclosure.

FIG. 6 shows a block diagram 600 of a communications manager 620 that supports switching orthogonal and non-orthogonal sequence based noncoherent uplink control transmissions in accordance with various aspects of the present disclosure. The communications manager 620 may be an example of aspects of a communications manager 420, a communications manager 520, or both, as described herein. The communications manager 620, or various components thereof, may be an example of means for performing various aspects of switching orthogonal and non-orthogonal sequence based noncoherent uplink control transmissions as described herein. For example, the communications manager 620 may include a payload identification component 625, a sequence codebook component 630, a transmission component 635, an RRC reception component 640, an indication bit component 645, or any combination thereof. Each of these components may communicate, directly or indirectly, with one another (e.g., via one or more buses).

The communications manager 620 may support wireless communications at a transmitter in accordance with examples as disclosed herein. The payload identification component 625 may be configured as or otherwise support a means for identifying a payload to include in a transmission to a receiver. The sequence codebook component 630 may be configured as or otherwise support a means for determining to transmit the transmission using an orthogonal sequence codebook or a non-orthogonal sequence codebook based on a size of the payload, a control message from the receiver to the transmitter, or a combination thereof. The transmission component 635 may be configured as or otherwise support a means for transmitting the transmission to the receiver based on whether the transmission is to use the orthogonal sequence codebook or the non-orthogonal sequence codebook.

In some examples, the transmission is an UCI transmission.

In some examples, to support determining to transmit the transmission using the orthogonal sequence codebook or the non-orthogonal sequence codebook, the sequence codebook component 630 may be configured as or otherwise support a means for determining to transmit the UCI transmission using the orthogonal sequence codebook based on a number of bits of the payload being less than or equal to a computed threshold.

In some examples, the computed threshold includes a value of a logarithm base two of a number of resource elements in a resource available for the UCI transmission.

In some examples, to support determining to transmit the transmission using the orthogonal sequence codebook or the non-orthogonal sequence codebook, the sequence codebook component 630 may be configured as or otherwise support a means for determining to transmit the UCI transmission using the non-orthogonal sequence codebook based on a number of bits of the payload being greater than a computed threshold.

In some examples, the computed threshold includes a value of a logarithm base two of a number of resource elements in a resource available for the UCI transmission.

In some examples, to support determining to transmit the transmission using the orthogonal sequence codebook or the non-orthogonal sequence codebook, the RRC reception component 640 may be configured as or otherwise support a means for receiving RRC signaling from the receiver, where the RRC signaling includes a scalar value. In some examples, to support determining to transmit the transmission using the orthogonal sequence codebook or the non-orthogonal sequence codebook, the sequence codebook component 630 may be configured as or otherwise support a means for determining to transmit the UCI transmission using the orthogonal sequence codebook based on a number of bits of the payload being less than or equal to a computed threshold weighted by the scalar value.

In some examples, the computed threshold weighted by the scalar value includes the scalar value multiplied by a logarithm base two of a number of resource elements in a resource available for the UCI transmission.

In some examples, to support determining to transmit the transmission using the orthogonal sequence codebook or the non-orthogonal sequence codebook, the RRC reception component 640 may be configured as or otherwise support a means for receiving RRC signaling from the receiver, where the RRC signaling includes a scalar value. In some examples, to support determining to transmit the transmission using the orthogonal sequence codebook or the non-orthogonal sequence codebook, the sequence codebook component 630 may be configured as or otherwise support a means for determining to transmit the UCI transmission using the non-orthogonal sequence codebook based on a number of bits of the payload being greater than a computed threshold weighted by the scalar value.

In some examples, the computed threshold weighted by the scalar value includes the scalar value multiplied by a logarithm base two of a number of resource elements in a resource available for the UCI transmission.

In some examples, to support determining to transmit the transmission using the orthogonal sequence codebook or the non-orthogonal sequence codebook, the indication bit component 645 may be configured as or otherwise support a means for receiving, from the receiver, an indication bit indicating that the transmitter is to transmit the UCI transmission using one of the orthogonal sequence codebook or the non-orthogonal sequence codebook. In some examples, to support determining to transmit the transmission using the orthogonal sequence codebook or the non-orthogonal sequence codebook, the sequence codebook component 630 may be configured as or otherwise support a means for determining to transmit the UCI transmission based on the indication bit.

In some examples, the indication bit component 645 may be configured as or otherwise support a means for receiving, from the receiver, the indication bit in a field of a DCI transmission, where the DCI transmission schedules a set of resources for the UCI transmission in a PUCCH.

In some examples, the indication bit component 645 may be configured as or otherwise support a means for receiving, from the receiver, the indication bit as a field in a RRC signaling, where the RRC signaling configures the UCI transmission in a PUCCH.

In some examples, the transmission is an uplink data transmission.

In some examples, to support determining to transmit the transmission using the orthogonal sequence codebook or the non-orthogonal sequence codebook, the sequence codebook component 630 may be configured as or otherwise support a means for determining to transmit the uplink data transmission using the orthogonal sequence codebook based on a number of bits of the payload being less than or equal to a computed threshold.

In some examples, the computed threshold includes a value of a logarithm base two of a number of resource elements in a resource available for the UCI transmission.

In some examples, to support determining to transmit the transmission using the orthogonal sequence codebook or the non-orthogonal sequence codebook, the sequence codebook component 630 may be configured as or otherwise support a means for determining to transmit the uplink data transmission using the non-orthogonal sequence codebook based on a number of bits of the payload being greater than a computed threshold.

In some examples, the UCI transmission includes a non-coherent transmission.

In some examples, the transmission is a downlink data transmission.

In some examples, to support determining to transmit the transmission using the orthogonal sequence codebook or the non-orthogonal sequence codebook, the sequence codebook component 630 may be configured as or otherwise support a means for determining to transmit the downlink data transmission using the orthogonal sequence codebook based on a number of bits of the payload being less than or equal to a computed threshold.

In some examples, to support determining to transmit the transmission using the orthogonal sequence codebook or the non-orthogonal sequence codebook, the sequence codebook component 630 may be configured as or otherwise support a means for determining to transmit the downlink data transmission using the non-orthogonal sequence codebook based on a number of bits of the payload being greater than a computed threshold.

In some examples, the transmission is a DCI transmission.

In some examples, to support determining to transmit the transmission using the orthogonal sequence codebook or the non-orthogonal sequence codebook, the sequence codebook component 630 may be configured as or otherwise support a means for determining to transmit the DCI transmission using the orthogonal sequence codebook based on a number of bits of the payload being less than or equal to a computed threshold.

In some examples, to support determining to transmit the transmission using the orthogonal sequence codebook or the non-orthogonal sequence codebook, the sequence codebook component 630 may be configured as or otherwise support a means for determining to transmit the DCI transmission using the non-orthogonal sequence codebook based on a number of bits of the payload being greater than a computed threshold.

In some examples, to support determining to transmit the transmission using the orthogonal sequence codebook or the non-orthogonal sequence codebook, the RRC reception component 640 may be configured as or otherwise support a means for receiving RRC signaling from the receiver, where the RRC signaling includes a scalar value. In some examples, to support determining to transmit the transmission using the orthogonal sequence codebook or the non-orthogonal sequence codebook, the sequence codebook component 630 may be configured as or otherwise support a means for determining to transmit the DCI transmission using the orthogonal sequence codebook based on a number of bits of the payload being less than or equal to a computed threshold weighted by the scalar value.

In some examples, to support determining to transmit the transmission using the orthogonal sequence codebook or the non-orthogonal sequence codebook, the RRC reception component 640 may be configured as or otherwise support a means for receiving RRC signaling from the receiver, where the RRC signaling includes a scalar value. In some examples, to support determining to transmit the transmission using the orthogonal sequence codebook or the non-orthogonal sequence codebook, the sequence codebook component 630 may be configured as or otherwise support a means for determining to transmit the DCI transmission using the non-orthogonal sequence codebook based on a number of bits of the payload being greater than a computed threshold weighted by the scalar value.

In some examples, to support determining to transmit the transmission using the orthogonal sequence codebook or the non-orthogonal sequence codebook, the indication bit component 645 may be configured as or otherwise support a means for receiving, from the receiver, an indication bit indicating that the transmitter is to transmit the DCI transmission using one of the orthogonal sequence codebook or the non-orthogonal sequence codebook. In some examples, to support determining to transmit the transmission using the orthogonal sequence codebook or the non-orthogonal sequence codebook, the sequence codebook component 630 may be configured as or otherwise support a means for determining to transmit the DCI transmission based on the indication bit.

Figure 7:
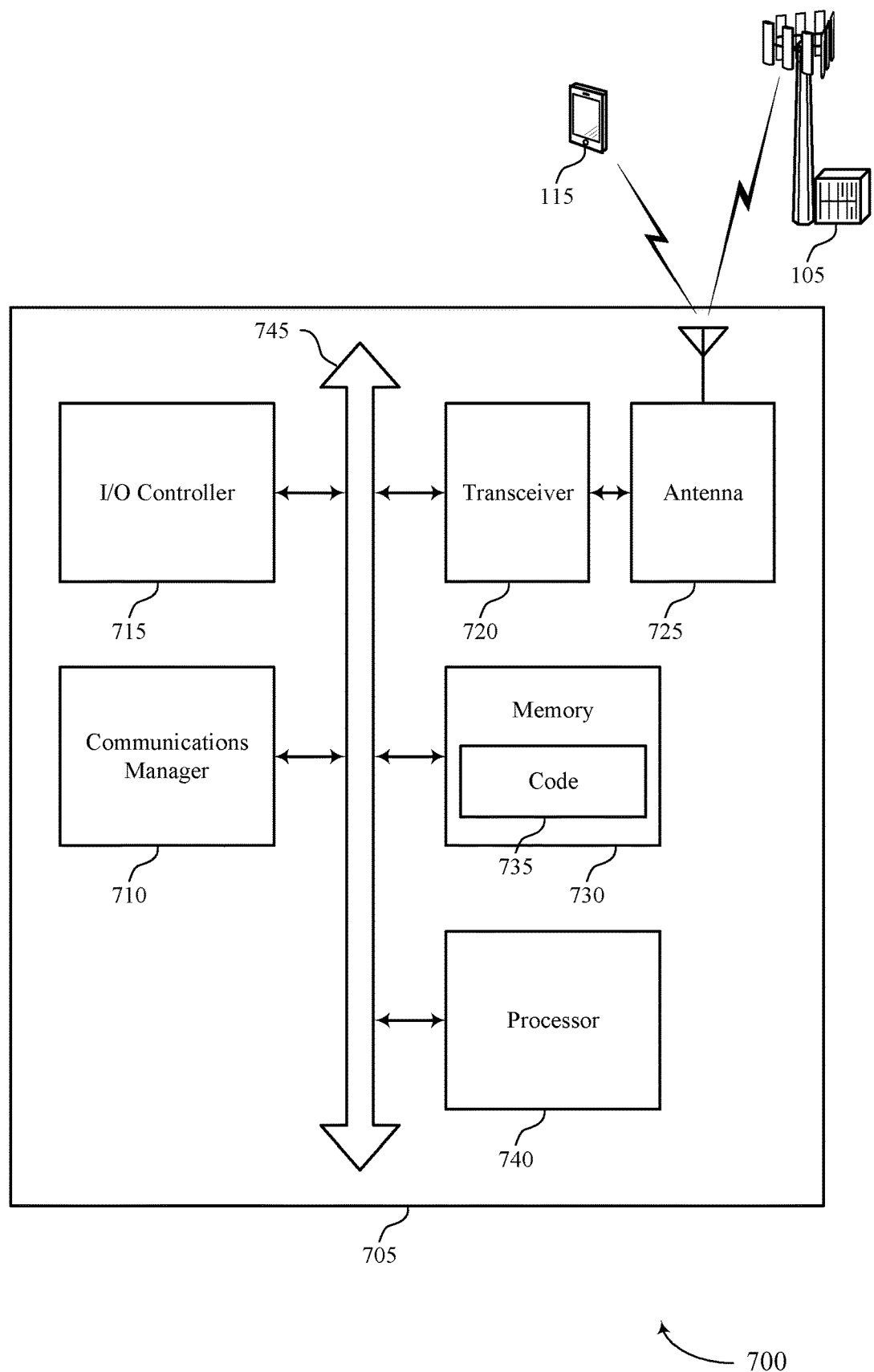
FIG. 7 shows a diagram of a system including a device that supports switching orthogonal and non-orthogonal sequence based noncoherent uplink control transmissions in accordance with various aspects of the present disclosure.

FIG. 7 shows a diagram of a system 700 including a device 705 that supports switching orthogonal and non-orthogonal sequence based noncoherent uplink control transmissions in accordance with various aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting switching orthogonal and non-orthogonal sequence based noncoherent uplink control transmissions). For example, the device 705 or a component of the device 705 may include a processor 740 and memory 730 coupled to the processor 740, the processor 740 and memory 730 configured to perform various functions described herein.

The communications manager 720 may support wireless communications at a transmitter in accordance with examples as disclosed herein. For example, the communications manager 720 may be configured as or otherwise support a means for identifying a payload to include in a transmission to a receiver. The communications manager 720 may be configured as or otherwise support a means for determining to transmit the transmission using an orthogonal sequence codebook or a non-orthogonal sequence codebook based on a size of the payload, a control message from the receiver to the transmitter, or a combination thereof. The communications manager 720 may be configured as or otherwise support a means for transmitting the transmission to the receiver based on whether the transmission is to use the orthogonal sequence codebook or the non-orthogonal sequence codebook.

By including or configuring the communications manager 720 in accordance with examples as described herein, the device 705 may support techniques for improving communications efficiency at a transmitting device. The transmitting device may efficiently determine to transmit a transmission based on a sequence codebook. The device may thus transmit transmission to a receiver based on a threshold, improving communications efficiency.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of switching orthogonal and non-orthogonal sequence based noncoherent uplink control transmissions as described herein, or the processor 740 and the memory 730 may be otherwise configured to perform or support such operations.

Figure 8:
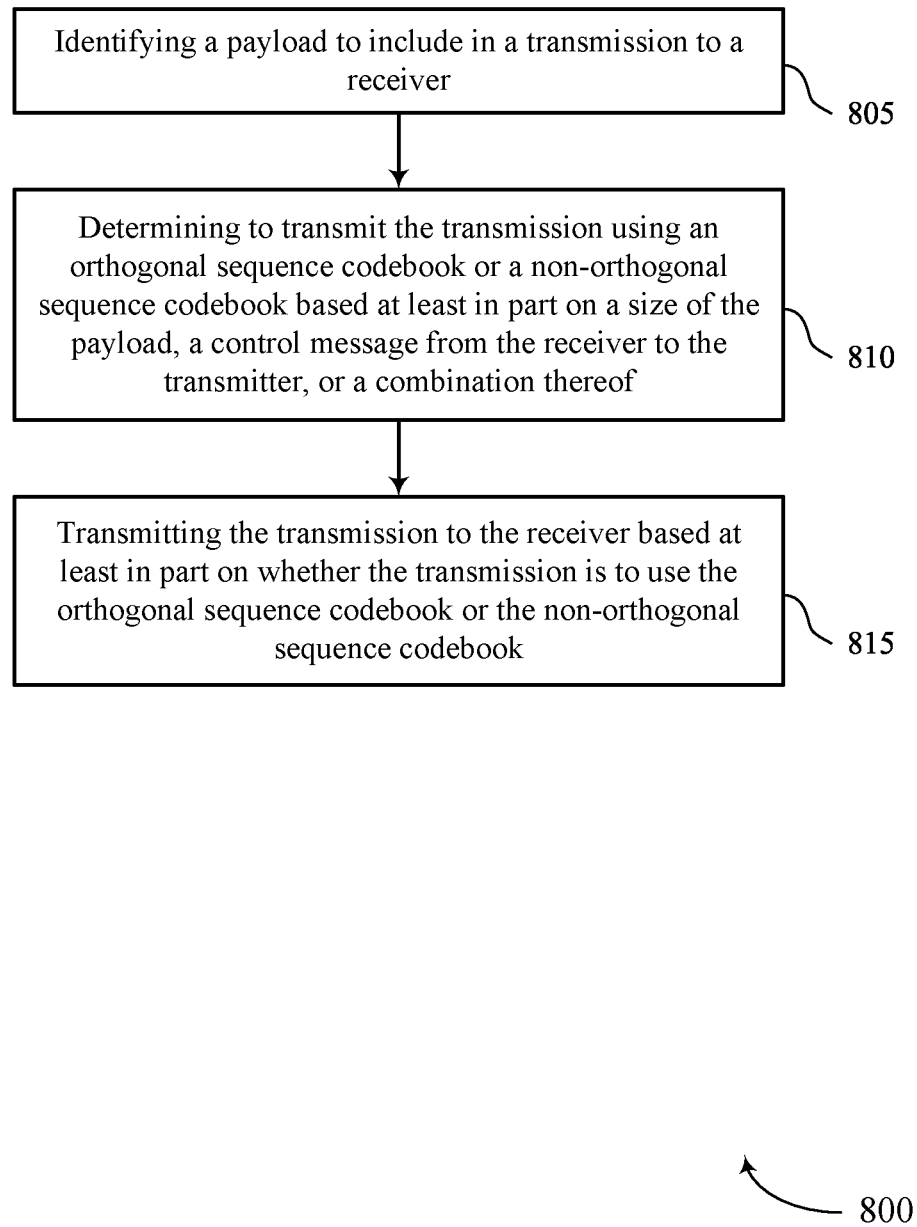
FIGS. 8 through 11 show flowcharts illustrating methods that support switching orthogonal and non-orthogonal sequence based noncoherent uplink control transmissions in accordance with various aspects of the present disclosure.

FIG. 8 shows a flowchart illustrating a method 800 that supports switching orthogonal and non-orthogonal sequence based noncoherent uplink control transmissions in accordance with various aspects of the present disclosure. The operations of the method 800 may be implemented by a transmitter, such as a UE or a base station, or its components as described herein. For example, the operations of the method 800 may be performed by a transmitter as described with reference to FIGS. 1 through 7. In some examples, a transmitter may execute a set of instructions to control the functional elements of the transmitter to perform the described functions. Additionally or alternatively, the transmitter may perform aspects of the described functions using special-purpose hardware.

At 805, the method may include identifying a payload to include in a transmission to a receiver. The operations of 805 may be performed in accordance with examples as disclosed herein. In some examples, aspects of the operations of 805 may be performed by a payload identification component 625 as described with reference to FIG. 6.

At 810, the method may include determining to transmit the transmission using an orthogonal sequence codebook or a non-orthogonal sequence codebook based on a size of the payload, a control message from the receiver to the transmitter, or a combination thereof. The operations of 810 may be performed in accordance with examples as disclosed herein. In some examples, aspects of the operations of 810 may be performed by a sequence codebook component 630 as described with reference to FIG. 6.

At 815, the method may include transmitting the transmission to the receiver based on whether the transmission is to use the orthogonal sequence codebook or the non-orthogonal sequence codebook. The operations of 815 may be performed in accordance with examples as disclosed herein. In some examples, aspects of the operations of 815 may be performed by a transmission component 635 as described with reference to FIG. 6.

Figure 9:
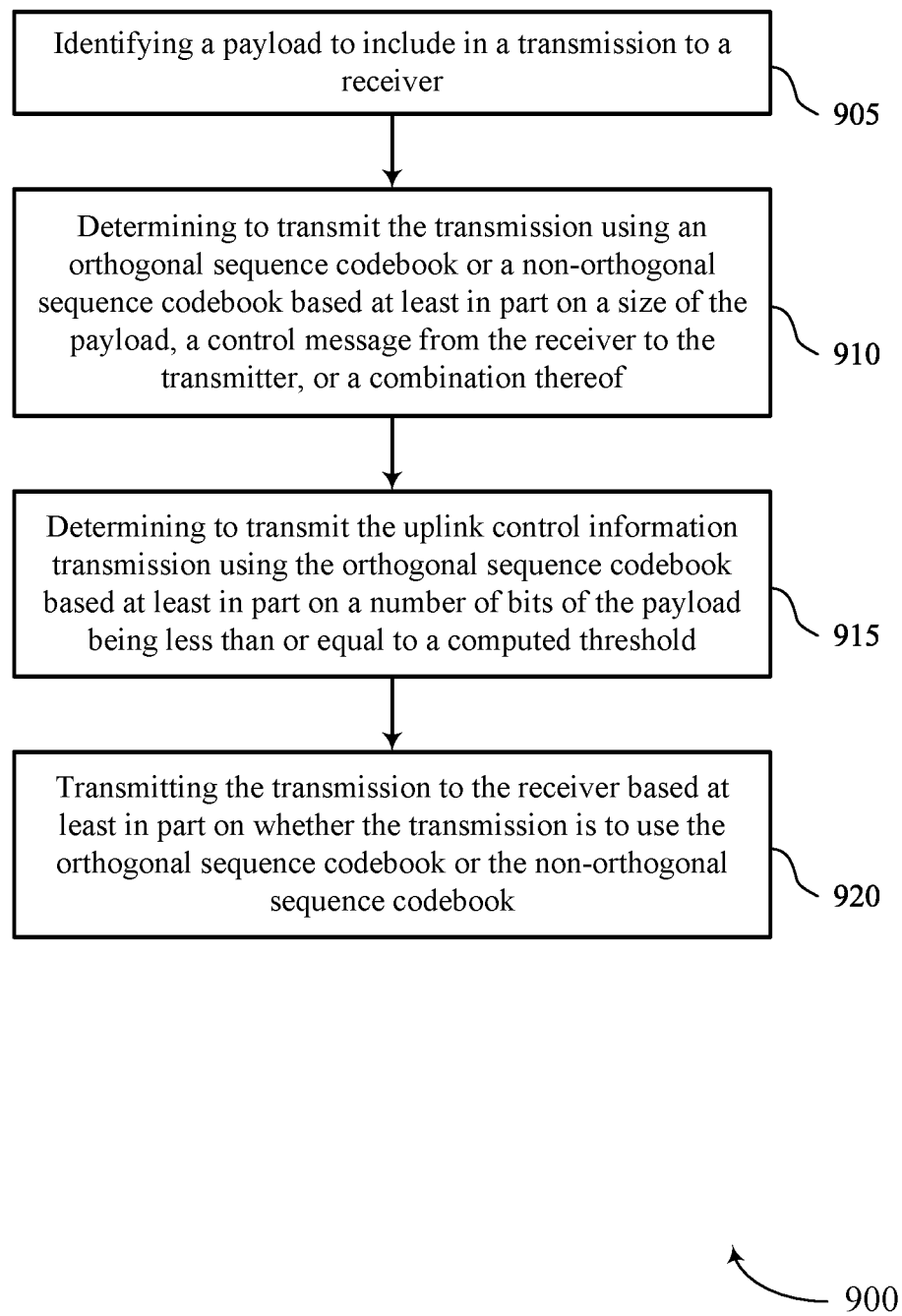

FIG. 9 shows a flowchart illustrating a method 900 that supports switching orthogonal and non-orthogonal sequence based noncoherent uplink control transmissions in accordance with various aspects of the present disclosure. The operations of the method 900 may be implemented by a transmitter, such as a base station or a UE or its components as described herein. For example, the operations of the method 900 may be performed by a transmitter 115 as described with reference to FIGS. 1 through 7. In some examples, a transmitter may execute a set of instructions to control the functional elements of the transmitter to perform the described functions. Additionally or alternatively, the transmitter may perform aspects of the described functions using special-purpose hardware.

At 905, the method may include identifying a payload to include in a transmission to a receiver. The operations of 905 may be performed in accordance with examples as disclosed herein. In some examples, aspects of the operations of 905 may be performed by a payload identification component 625 as described with reference to FIG. 6.

At 910, the method may include determining to transmit the transmission using an orthogonal sequence codebook or a non-orthogonal sequence codebook based on a size of the payload, a control message from the receiver to the transmitter, or a combination thereof. The operations of 910 may be performed in accordance with examples as disclosed herein. In some examples, aspects of the operations of 910 may be performed by a sequence codebook component 630 as described with reference to FIG. 6.

At 915, the method may include determining to transmit the uplink control information transmission using the orthogonal sequence codebook based on a number of bits of the payload being less than or equal to a computed threshold. The operations of 915 may be performed in accordance with examples as disclosed herein. In some examples, aspects of the operations of 915 may be performed by a sequence codebook component 630 as described with reference to FIG. 6.

At 920, the method may include transmitting the transmission to the receiver based on whether the transmission is to use the orthogonal sequence codebook or the non-orthogonal sequence codebook. The operations of 920 may be performed in accordance with examples as disclosed herein. In some examples, aspects of the operations of 920 may be performed by a transmission component 635 as described with reference to FIG. 6.

Figure 10:
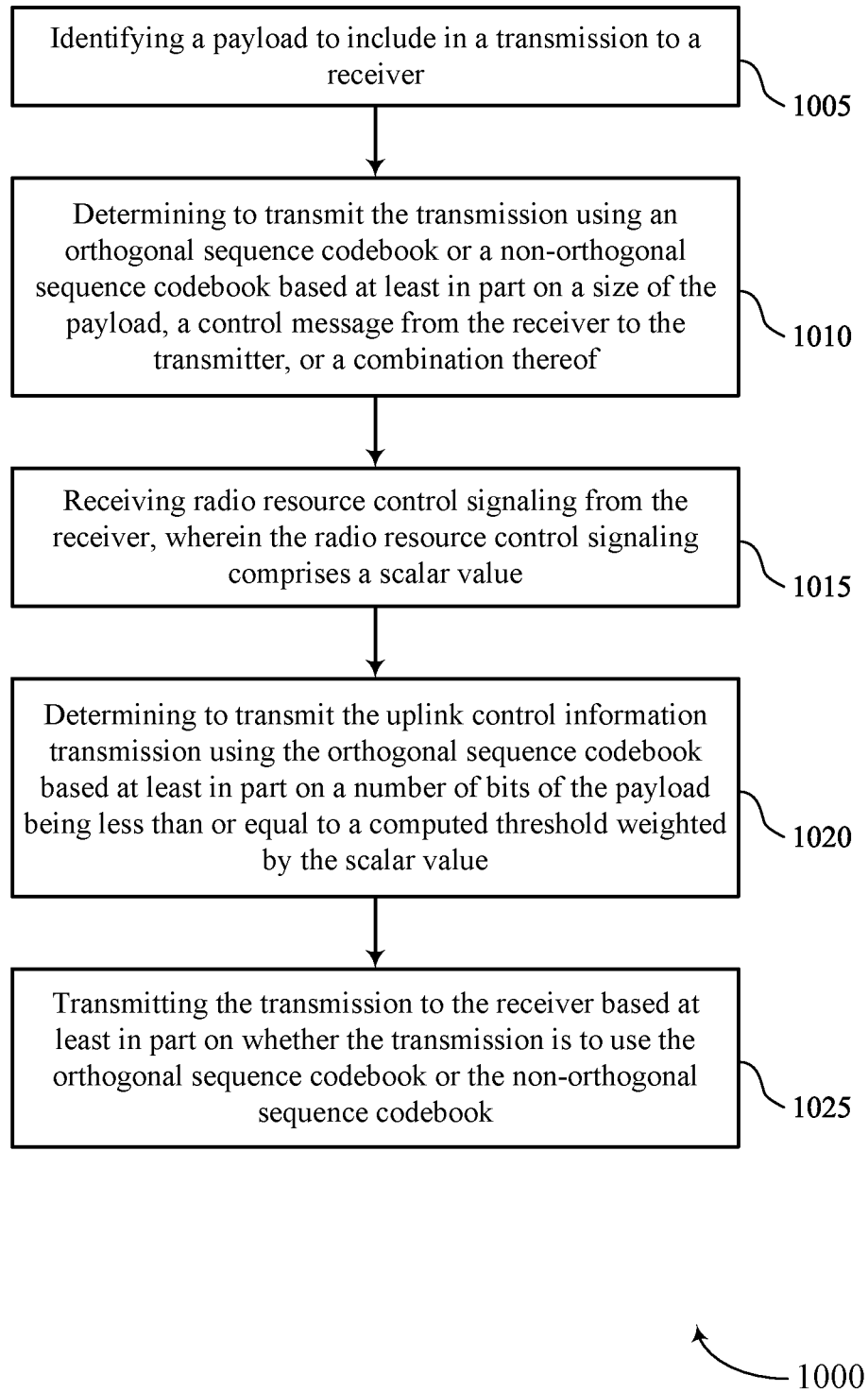

FIG. 10 shows a flowchart illustrating a method 1000 that supports switching orthogonal and non-orthogonal sequence based noncoherent uplink control transmissions in accordance with various aspects of the present disclosure. The operations of the method 1000 may be implemented by a transmitter, such as a base station or a UE, or its components as described herein. For example, the operations of the method 1000 may be performed by a transmitter 115 as described with reference to FIGS. 1 through 7. In some examples, a transmitter may execute a set of instructions to control the functional elements of the transmitter to perform the described functions. Additionally or alternatively, the transmitter may perform aspects of the described functions using special-purpose hardware.

At 1005, the method may include identifying a payload to include in a transmission to a receiver. The operations of 1005 may be performed in accordance with examples as disclosed herein. In some examples, aspects of the operations of 1005 may be performed by a payload identification component 625 as described with reference to FIG. 6.

At 1010, the method may include determining to transmit the transmission using an orthogonal sequence codebook or a non-orthogonal sequence codebook based on a size of the payload, a control message from the receiver to the transmitter, or a combination thereof. The operations of 1010 may be performed in accordance with examples as disclosed herein. In some examples, aspects of the operations of 1010 may be performed by a sequence codebook component 630 as described with reference to FIG. 6.

At 1015, the method may include receiving RRC signaling from the receiver, where the RRC signaling includes a scalar value. The operations of 1015 may be performed in accordance with examples as disclosed herein. In some examples, aspects of the operations of 1015 may be performed by an RRC reception component 640 as described with reference to FIG. 6.

At 1020, the method may include determining to transmit the uplink control information transmission using the orthogonal sequence codebook based on a number of bits of the payload being less than or equal to a computed threshold weighted by the scalar value. The operations of 1020 may be performed in accordance with examples as disclosed herein. In some examples, aspects of the operations of 1020 may be performed by a sequence codebook component 630 as described with reference to FIG. 6.

At 1025, the method may include transmitting the transmission to the receiver based on whether the transmission is to use the orthogonal sequence codebook or the non-orthogonal sequence codebook. The operations of 1025 may be performed in accordance with examples as disclosed herein. In some examples, aspects of the operations of 1025 may be performed by a transmission component 635 as described with reference to FIG. 6.

Figure 11:
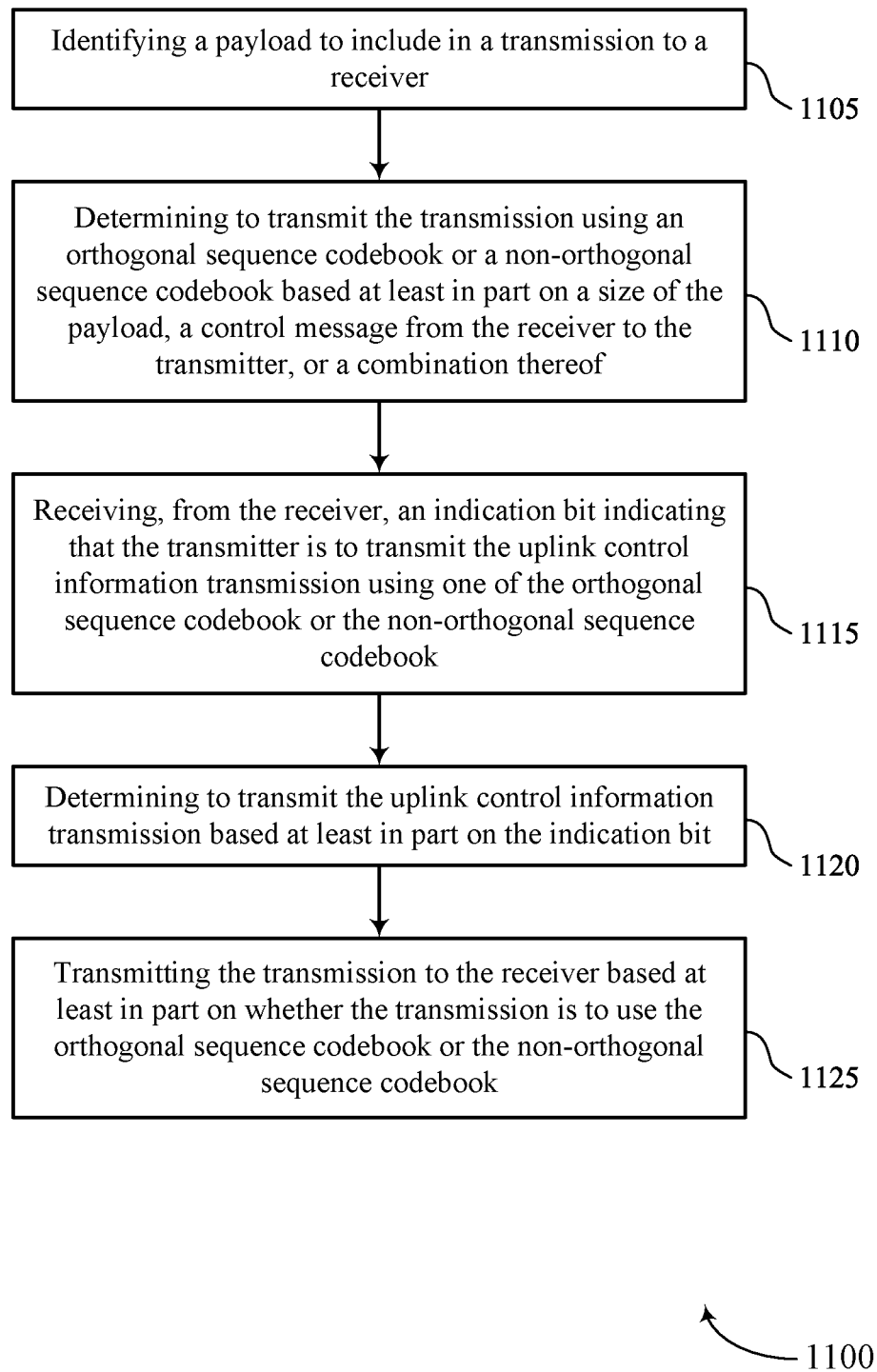

FIG. 11 shows a flowchart illustrating a method 1100 that supports switching orthogonal and non-orthogonal sequence based noncoherent uplink control transmissions in accordance with various aspects of the present disclosure. The operations of the method 1100 may be implemented by a transmitter, such as a UE or a base station, or its components as described herein. For example, the operations of the method 1100 may be performed by a transmitter 115 as described with reference to FIGS. 1 through 7. In some examples, a transmitter may execute a set of instructions to control the functional elements of the transmitter to perform the described functions. Additionally or alternatively, the transmitter may perform aspects of the described functions using special-purpose hardware.

At 1105, the method may include identifying a payload to include in a transmission to a receiver. The operations of 1105 may be performed in accordance with examples as disclosed herein. In some examples, aspects of the operations of 1105 may be performed by a payload identification component 625 as described with reference to FIG. 6.

At 1110, the method may include determining to transmit the transmission using an orthogonal sequence codebook or a non-orthogonal sequence codebook based on a size of the payload, a control message from the receiver to the transmitter, or a combination thereof. The operations of 1110 may be performed in accordance with examples as disclosed herein. In some examples, aspects of the operations of 1110 may be performed by a sequence codebook component 630 as described with reference to FIG. 6.

At 1115, the method may include receiving, from the receiver, an indication bit indicating that the transmitter is to transmit the uplink control information transmission using one of the orthogonal sequence codebook or the non-orthogonal sequence codebook. The operations of 1115 may be performed in accordance with examples as disclosed herein. In some examples, aspects of the operations of 1115 may be performed by an indication bit component 645 as described with reference to FIG. 6.

At 1120, the method may include determining to transmit the uplink control information transmission based on the indication bit. The operations of 1120 may be performed in accordance with examples as disclosed herein. In some examples, aspects of the operations of 1120 may be performed by a sequence codebook component 630 as described with reference to FIG. 6.

At 1125, the method may include transmitting the transmission to the receiver based on whether the transmission is to use the orthogonal sequence codebook or the non-orthogonal sequence codebook. The operations of 1125 may be performed in accordance with examples as disclosed herein. In some examples, aspects of the operations of 1125 may be performed by a transmission component 635 as described with reference to FIG. 6.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a transmitter, comprising: identifying a payload to include in a transmission to a receiver; determining to transmit the transmission using an orthogonal sequence codebook or a non-orthogonal sequence codebook based at least in part on a size of the payload, a control message from the receiver to the transmitter, or a combination thereof; and transmitting the transmission to the receiver based at least in part on whether the transmission is to use the orthogonal sequence codebook or the non-orthogonal sequence codebook.

Aspect 2: The method of aspect 1, wherein the transmission is an UCI transmission.

Aspect 3: The method of aspect 2, wherein determining to transmit the transmission using the orthogonal sequence codebook or the non-orthogonal sequence codebook further comprises: determining to transmit the UCI transmission using the orthogonal sequence codebook based at least in part on a number of bits of the payload being less than or equal to a computed threshold.

Aspect 4: The method of any of aspects 2 through 3, wherein the computed threshold comprises a value of a logarithm base two of a number of resource elements in a resource available for the UCI transmission.

Aspect 5: The method of any of aspects 2 through 4, wherein determining to transmit the transmission using the orthogonal sequence codebook or the non-orthogonal sequence codebook further comprises: determining to transmit the UCI transmission using the non-orthogonal sequence codebook based at least in part on a number of bits of the payload being greater than a computed threshold.

Aspect 6: The method of aspect 5, wherein the computed threshold comprises a value of a logarithm base two of a number of resource elements in a resource available for the UCI transmission.

Aspect 7: The method of any of aspects 2 through 6, wherein determining to transmit the transmission using the orthogonal sequence codebook or the non-orthogonal sequence codebook further comprises: receiving RRC signaling from the receiver, wherein the RRC signaling comprises a scalar value; and determining to transmit the UCI transmission using the orthogonal sequence codebook based at least in part on a number of bits of the payload being less than or equal to a computed threshold weighted by the scalar value.

Aspect 8: The method of aspect 7, wherein the computed threshold weighted by the scalar value comprises the scalar value multiplied by a logarithm base two of a number of resource elements in a resource available for the UCI transmission.

Aspect 9: The method of any of aspects 2 through 8, wherein determining to transmit the transmission using the orthogonal sequence codebook or the non-orthogonal sequence codebook further comprises: receiving RRC signaling from the receiver, wherein the RRC signaling comprises a scalar value; and determining to transmit the UCI transmission using the non-orthogonal sequence codebook based at least in part on a number of bits of the payload being greater than a computed threshold weighted by the scalar value.

Aspect 10: The method of aspect 9, wherein the computed threshold weighted by the scalar value comprises the scalar value multiplied by a logarithm base two of a number of resource elements in a resource available for the UCI transmission.

Aspect 11: The method of any of aspects 2 through 10, wherein determining to transmit the transmission using the orthogonal sequence codebook or the non-orthogonal sequence codebook further comprises: receiving, from the receiver, an indication bit indicating that the transmitter is to transmit the UCI transmission using one of the orthogonal sequence codebook or the non-orthogonal sequence codebook; and determining to transmit the UCI transmission based at least in part on the indication bit.

Aspect 12: The method of aspect 11, further comprising: receiving, from the receiver, the indication bit in a field of a DCI transmission, wherein the DCI transmission schedules a set of resources for the UCI transmission in a PUCCH.

Aspect 13: The method of any of aspects 11 through 12, further comprising: receiving, from the receiver, the indication bit as a field in a RRC signaling, wherein the RRC signaling configures the UCI transmission in a PUCCH.

Aspect 14: The method of any of aspects 1 through 13, wherein the transmission is an uplink data transmission.

Aspect 15: The method of aspect 14, wherein determining to transmit the transmission using the orthogonal sequence codebook or the non-orthogonal sequence codebook further comprises: determining to transmit the uplink data transmission using the orthogonal sequence codebook based at least in part on a number of bits of the payload being less than or equal to a computed threshold.

Aspect 16: The method of any of aspects 14 through 15, wherein the computed threshold comprises a value of a logarithm base two of a number of resource elements in a resource available for the uplink data transmission.

Aspect 17: The method of any of aspects 14 through 16, wherein determining to transmit the transmission using the orthogonal sequence codebook or the non-orthogonal sequence codebook further comprises: determining to transmit the uplink data transmission using the non-orthogonal sequence codebook based at least in part on a number of bits of the payload being greater than a computed threshold.

Aspect 18: The method of any of aspects 1 through 17, wherein the transmission comprises a non-coherent UCI transmission.

Aspect 19: The method of any of aspects 1 through 18, wherein the transmission is a downlink data transmission.

Aspect 20: The method of aspect 19, wherein determining to transmit the transmission using the orthogonal sequence codebook or the non-orthogonal sequence codebook further comprises: determining to transmit the downlink data transmission using the orthogonal sequence codebook based at least in part on a number of bits of the payload being less than or equal to a computed threshold.

Aspect 21: The method of any of aspects 19 through 20, wherein determining to transmit the transmission using the orthogonal sequence codebook or the non-orthogonal sequence codebook further comprises: determining to transmit the downlink data transmission using the non-orthogonal sequence codebook based at least in part on a number of bits of the payload being greater than a computed threshold.

Aspect 22: The method of any of aspects 1 through 21, wherein the transmission is a DCI transmission.

Aspect 23: The method of aspect 22, wherein determining to transmit the transmission using the orthogonal sequence codebook or the non-orthogonal sequence codebook further comprises: determining to transmit the DCI transmission using the orthogonal sequence codebook based at least in part on a number of bits of the payload being less than or equal to a computed threshold.

Aspect 24: The method of any of aspects 22 through 23, wherein determining to transmit the transmission using the orthogonal sequence codebook or the non-orthogonal sequence codebook further comprises: determining to transmit the DCI transmission using the non-orthogonal sequence codebook based at least in part on a number of bits of the payload being greater than a computed threshold.

Aspect 25: The method of any of aspects 22 through 24, wherein determining to transmit the transmission using the orthogonal sequence codebook or the non-orthogonal sequence codebook further comprises: receiving RRC signaling from the receiver, wherein the RRC signaling comprises a scalar value; and determining to transmit the DCI transmission using the orthogonal sequence codebook based at least in part on a number of bits of the payload being less than or equal to a computed threshold weighted by the scalar value.

Aspect 26: The method of any of aspects 22 through 25, wherein determining to transmit the transmission using the orthogonal sequence codebook or the non-orthogonal sequence codebook further comprises: receiving RRC signaling from the receiver, wherein the RRC signaling comprises a scalar value; and determining to transmit the DCI transmission using the non-orthogonal sequence codebook based at least in part on a number of bits of the payload being greater than a computed threshold weighted by the scalar value.

Aspect 27: The method of any of aspects 22 through 26, wherein determining to transmit the transmission using the orthogonal sequence codebook or the non-orthogonal sequence codebook further comprises: receiving, from the receiver, an indication bit indicating that the transmitter is to transmit the DCI transmission using one of the orthogonal sequence codebook or the non-orthogonal sequence codebook; and determining to transmit the DCI transmission based at least in part on the indication bit.

Aspect 28: An apparatus for wireless communications at a transmitter, comprising a processor; memory coupled with the processor; and instructions stored in the memory and executable by the processor to cause the apparatus to perform a method of any of aspects 1 through 27.

Aspect 29: An apparatus for wireless communications at a transmitter, comprising at least one means for performing a method of any of aspects 1 through 27.

Aspect 30: A non-transitory computer-readable medium storing code for wireless communications at a transmitter, the code comprising instructions executable by a processor to perform a method of any of aspects 1 through 27.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a transmitter, comprising:
 a memory; and
 at least one processor coupled to the memory, wherein the transmitter is configured to:
  identify a payload to include in a noncoherent transmission to a receiver;
  determine to transmit the noncoherent transmission using an orthogonal sequence codebook or a non-orthogonal sequence codebook based on a size of the payload, wherein the orthogonal sequence codebook is used based on the size of the payload being less than or equal to a threshold, and wherein the non-orthogonal sequence codebook is used based on the size of the payload being greater than the threshold; and
  transmit the noncoherent transmission to the receiver based on whether the noncoherent transmission is to use the orthogonal sequence codebook or the non-orthogonal sequence codebook, wherein the orthogonal sequence codebook and the non-orthogonal sequence codebook are associated with the non-coherent transmission.

2. The apparatus of claim 1, wherein the noncoherent transmission is an uplink control information transmission.

3. The apparatus of claim 2, wherein, to determine to transmit the noncoherent transmission using the orthogonal sequence codebook or the non-orthogonal sequence codebook, the transmitter is configured to:
determine to transmit the uplink control information transmission using the orthogonal sequence codebook.

4. The apparatus of claim 2, wherein, to determine to transmit the noncoherent transmission using the orthogonal sequence codebook or the non-orthogonal sequence codebook, the transmitter is configured to:
determine to transmit the uplink control information transmission using the non-orthogonal sequence codebook.

5. The apparatus of claim 2, wherein the threshold comprises a value of a logarithm base two of a number of resource elements in a resource available for the uplink control information transmission.

6. The apparatus of claim 2, wherein the transmitter is configured to:
receive radio resource control signaling from the receiver, wherein the radio resource control signaling comprises a scalar value, wherein the threshold is a weighted threshold that is weighted by the scalar value, and
wherein the orthogonal sequence codebook is used to transmit the uplink control information transmission based at least in part on the size of the payload being less than or equal to the weighted threshold.

7. The apparatus of claim 6, wherein the weighted threshold comprises the scalar value multiplied by a logarithm base two of a number of resource elements in a resource available for the uplink control information transmission.

8. The apparatus of claim 2, wherein the transmitter is configured to:
receive radio resource control signaling from the receiver, wherein the radio resource control signaling comprises a scalar value, wherein the threshold is a weighted threshold that is weighted by the scalar value, and
wherein the non-orthogonal sequence codebook is used to transmit the uplink control information transmission based at least in part on the size of the payload being greater than the weighted threshold.

9. The apparatus of claim 8, wherein the weighted threshold comprises the scalar value multiplied by a logarithm base two of a number of resource elements in a resource available for the uplink control information transmission.

10. The apparatus of claim 1, wherein the noncoherent transmission is an uplink data transmission.

11. The apparatus of claim 10, wherein, to determine to transmit the noncoherent transmission using the orthogonal sequence codebook or the non-orthogonal sequence codebook, the transmitter is configured to:
determine to transmit the uplink data transmission using the orthogonal sequence codebook.

12. The apparatus of claim 10, wherein the threshold comprises a value of a logarithm base two of a number of resource elements in a resource available for the uplink data transmission.

13. The apparatus of claim 10, wherein, to determine to transmit the noncoherent transmission using the orthogonal sequence codebook or the non-orthogonal sequence codebook, the transmitter is configured to:
determine to transmit the uplink data transmission using the non-orthogonal sequence codebook.

14. The apparatus of claim 1, wherein the noncoherent transmission is a downlink data transmission.

15. The apparatus of claim 14, wherein, to determine to transmit the noncoherent transmission using the orthogonal sequence codebook or the non-orthogonal sequence codebook, the transmitter is configured to:
determine to transmit the downlink data transmission using the orthogonal sequence codebook.

16. The apparatus of claim 14, wherein, to determine to transmit the noncoherent transmission using the orthogonal sequence codebook or the non-orthogonal sequence codebook, the transmitter is configured to:
determine to transmit the downlink data transmission using the non-orthogonal sequence codebook.

17. The apparatus of claim 1, wherein the noncoherent transmission is a downlink control information transmission.

18. The apparatus of claim 17, wherein, to determine to transmit the noncoherent transmission using the orthogonal sequence codebook or the non-orthogonal sequence codebook, the transmitter is configured to:
determine to transmit the downlink control information transmission using the orthogonal sequence codebook.

19. The apparatus of claim 17, wherein, to determine to transmit the noncoherent transmission using the orthogonal sequence codebook or the non-orthogonal sequence codebook, the transmitter is configured to:
determine to transmit the downlink control information transmission using the non-orthogonal sequence codebook.

20. The apparatus of claim 17, wherein the transmitter is configured to:
receive radio resource control signaling from the receiver, wherein the radio resource control signaling comprises a scalar value, wherein the threshold is a weighted threshold that is weighted by the scalar value, and
wherein the orthogonal sequence codebook is used to transmit the downlink control information transmission based at least in part on the size of the payload being less than or equal to the weighted threshold.

21. The apparatus of claim 17, wherein the transmitter is configured to:
receive radio resource control signaling from the receiver, wherein the radio resource control signaling comprises a scalar value, wherein the threshold is a weighted threshold that is weighted by the scalar value, and
wherein the non-orthogonal sequence codebook is used to transmit the downlink control information transmission based at least in part on the size of the payload being greater than the weighted threshold.

22. The apparatus of claim 1, wherein the determination to transmit the noncoherent transmission is further based on a control message from the receiver to the transmitter.

23. A method for wireless communications at a transmitter, comprising:
identifying a payload to include in a noncoherent transmission to a receiver;
determining to transmit the noncoherent transmission using an orthogonal sequence codebook a non-orthogonal sequence codebook based on a size of the payload, wherein the orthogonal sequence codebook is used based on the size of the payload being less than or equal to a threshold, and wherein the non-orthogonal sequence codebook is used based on the size of the payload being greater than the threshold; and transmitting the noncoherent transmission to the receiver based on whether the noncoherent transmission is to use the orthogonal sequence codebook or the non-orthogonal sequence codebook, wherein the orthogonal sequence codebook and the non-orthogonal sequence codebook are associated with the noncoherent transmission.

24. The method of claim 23, wherein determining to transmit the noncoherent transmission is further based on a control message from the receiver to the transmitter.

25. The method of claim 23, wherein the noncoherent transmission comprises an uplink control information transmission, an uplink data transmission, a downlink control information transmission, or a downlink data transmission.

26. The method of claim 23, wherein the threshold comprises a value of a logarithm base two of a number of resource elements in a resource available for the noncoherent transmission.

27. The method of claim 23, further comprising:
receiving, from the receiver, radio resource control signaling comprising a scalar value, wherein the threshold is a weighted threshold that is weighted by the scalar value, and
wherein the noncoherent transmission comprises an uplink control information transmission or a downlink control information transmission.

28. The method of claim 23, wherein the weighted threshold comprises the scalar value multiplied by a logarithm base two of a number of resource elements in a resource available for the noncoherent transmission.

29. An apparatus for wireless communications at a transmitter, comprising:
means for identifying a payload to include in a noncoherent transmission to a receiver;
means for determining to transmit the noncoherent transmission using an orthogonal sequence codebook or a non-orthogonal sequence codebook based on a size of the payload, wherein the orthogonal sequence codebook is used based on the size of the payload being less than or equal to a threshold, and wherein the non-orthogonal sequence codebook is used based on the size of the payload being greater than the threshold; and
means for transmitting the noncoherent transmission to the receiver based on whether the noncoherent transmission is to use the orthogonal sequence codebook or the non-orthogonal sequence codebook, wherein the orthogonal sequence codebook and the non-orthogonal sequence codebook are associated with the noncoherent transmission.

30. A non-transitory computer-readable medium having code for wireless communications stored thereon that, when executed by a transmitter, causes the transmitter to:
identify a payload to include in a noncoherent transmission to a receiver;
determine to transmit the noncoherent transmission using an orthogonal sequence codebook or a non-orthogonal sequence codebook based on a size of the payload, wherein the orthogonal sequence codebook is used based on the size of the payload being less than or equal to a threshold, and wherein the non-orthogonal sequence codebook is used based on the size of the payload being greater than the threshold; and
transmit the noncoherent transmission to the receiver based on whether the noncoherent transmission is to use the orthogonal sequence codebook or the non-orthogonal sequence codebook, wherein the orthogonal sequence codebook and the non-orthogonal sequence codebook are associated with the noncoherent transmission.

* * * * *